(12) United States Patent
Wang et al.

(10) Patent No.: US 8,513,361 B2
(45) Date of Patent: Aug. 20, 2013

(54) INTERPOLYMERS CONTAINING ISOBUTYLENE AND DIENE MER UNITS

(75) Inventors: Xiaorong Wang, Hudson, OH (US); Yuan-Yong Yan, Copley, OH (US)

(73) Assignee: Bridgestone Corporation, Tokyo (JP)

( * ) Notice: Subject to any disclaimer, the term of this patent is extended or adjusted under 35 U.S.C. 154(b) by 291 days.

(21) Appl. No.: 12/808,943

(22) PCT Filed: Dec. 29, 2008

(86) PCT No.: PCT/US2008/088449
§ 371 (c)(1),
(2), (4) Date: Jul. 23, 2010

(87) PCT Pub. No.: WO2009/086519
PCT Pub. Date: Jul. 9, 2009

(65) Prior Publication Data
US 2011/0028653 A1 Feb. 3, 2011

(51) Int. Cl.
*C08L 53/02* (2006.01)

(52) U.S. Cl.
USPC ............................ 525/232; 525/242; 525/207

(58) Field of Classification Search
USPC .......................................... 525/242, 207, 232
See application file for complete search history.

(56) References Cited

U.S. PATENT DOCUMENTS

| | | | |
|---|---|---|---|
| 2,725,367 A | 11/1955 | Niederhauser et al. | |
| 1,971,934 A | 2/1961 | Brown et al. | |
| 3,244,664 A | 4/1966 | Zelinski et al. | |
| 3,281,383 A | 10/1966 | Zelinski et al. | |
| 3,297,654 A | 1/1967 | Barr et al. | |
| 3,414,551 A | 12/1968 | Reid et al. | |
| 3,428,596 A | 2/1969 | Strand et al. | |
| 3,465,059 A | 9/1969 | Manfred K. Seven | |
| 3,480,580 A | 11/1969 | Joyner et al. | |
| 3,481,910 A | 12/1969 | Brunson | |
| 3,492,227 A | 1/1970 | Kolaian | |
| 3,528,936 A | 9/1970 | Kent et al. | |
| 3,539,664 A | 11/1970 | Kray | |
| 3,577,365 A | 5/1971 | Folzenlogen et al. | |
| 3,594,452 A | 7/1971 | De La Mare et al. | |
| 3,634,543 A | 1/1972 | Sherman | |
| 3,644,571 A | 2/1972 | Anderson | |
| 3,673,277 A | 6/1972 | Schmitt et al. | |
| 3,751,378 A | 8/1973 | Cowperthwaite et al. | |
| 3,761,458 A | 9/1973 | Holler et al. | |
| 3,796,687 A | 3/1974 | Collette et al. | |
| 3,862,265 A | 1/1975 | Steinkamp et al. | |
| 3,963,799 A | 6/1976 | Starkweather, Jr. | |
| 3,972,961 A | 8/1976 | Hammer et al. | |
| 3,976,720 A | 8/1976 | Hammer et al. | |
| 3,985,830 A | 10/1976 | Fetters et al. | |
| 3,998,907 A | 12/1976 | DiGiulio | |
| 4,015,612 A | 4/1977 | Pavlik et al. | |
| 4,017,557 A | 4/1977 | Hammer et al. | |
| 4,017,669 A | 4/1977 | Collette et al. | |
| 4,075,186 A | 2/1978 | Ambrose et al. | |
| 4,078,014 A | 3/1978 | Starkweather, Jr. et al. | |
| 4,087,485 A | 5/1978 | Huff | |
| 4,104,241 A | 8/1978 | Roberts et al. | |
| 4,104,332 A | 8/1978 | Zelinski | |
| 4,132,531 A | 1/1979 | Cummings et al. | |
| 4,139,417 A | 2/1979 | Marie et al. | |
| 4,151,336 A | 4/1979 | Sackmann et al. | |
| 4,151,337 A | 4/1979 | Kanoh et al. | |
| 4,247,434 A | 1/1981 | Lovelace et al. | |
| 4,283,502 A | 8/1981 | Richardson | |
| 4,287,314 A | 9/1981 | Fava | |
| 4,304,886 A | 12/1981 | Bean, Jr. et al. | |
| 4,320,213 A | 3/1982 | Woodbrey et al. | |
| 4,374,910 A | 2/1983 | Glugla | |
| 4,374,951 A | 2/1983 | Lee et al. | |
| 4,404,321 A | 9/1983 | Abolins et al. | |
| 4,404,322 A | 9/1983 | Saito et al. | |
| 4,408,010 A | 10/1983 | Le-Khac | |
| 4,409,365 A | 10/1983 | Coran et al. | |
| 4,423,196 A | 12/1983 | Arlt et al. | |
| 4,502,229 A | 3/1985 | Kitzman | |
| 4,506,056 A | 3/1985 | Gaylord | |
| 4,540,753 A | 9/1985 | Cozewith et al. | |
| 4,585,824 A | 4/1986 | Uchida et al. | |
| 4,605,700 A | 8/1986 | Le-Khac | |
| 4,683,275 A | 7/1987 | Kato et al. | |
| 4,704,414 A | 11/1987 | Kerner et al. | |
| 4,728,463 A | 3/1988 | Sutker et al. | |
| 4,732,928 A | 3/1988 | Mizushiro et al. | |
| 4,735,992 A | 4/1988 | Nogues | |
| 4,771,097 A | 9/1988 | Sackmann et al. | |
| 4,772,657 A | 9/1988 | Akiyama et al. | |
| 4,829,135 A | 5/1989 | Gunesin et al. | |
| 4,889,896 A | 12/1989 | Canova et al. | |
| 4,893,055 A | 1/1990 | Fuzii et al. | |
| 4,910,261 A | 3/1990 | Kaszas et al. | |
| 4,912,144 A | 3/1990 | McCready | |

(Continued)

FOREIGN PATENT DOCUMENTS

| AU | 8414880 | 9/1984 |
|---|---|---|
| CA | 702610 | 1/1965 |

(Continued)

OTHER PUBLICATIONS

Machine Translation of JP 11080364 (2012).*

(Continued)

*Primary Examiner* — Mark Kaucher
(74) *Attorney, Agent, or Firm* — Meredith E. Hooker; Nathan T. Lewis

(57) ABSTRACT

This disclosure relates to a block interpolymer comprising at least one diene block and at least one butyl block, wherein the at least one butyl block comprises residue from a functionalizing agent on at least one end adjacent to the diene block(s). The disclosure also relates to methods of making such block interpolymers. Also disclosed is a rubber composition comprising: (a) a block interpolymer comprising at least one diene block and at least one butyl block, and (b) a filler, wherein said at least one butyl block comprises residue from a functionalizing agent on at least one end adjacent to said diene block(s).

18 Claims, 3 Drawing Sheets

(56) References Cited

U.S. PATENT DOCUMENTS

| | | |
|---|---|---|
| 4,921,910 A | 5/1990 | Lunt et al. |
| 4,931,502 A | 6/1990 | McCready |
| 4,942,209 A | 7/1990 | Gunesin |
| 4,983,690 A | 1/1991 | Cameron et al. |
| 4,996,262 A | 2/1991 | Pyke et al. |
| 5,008,324 A | 4/1991 | Killgoar, Jr. et al. |
| 5,034,449 A | 7/1991 | Mallikarjun |
| 5,037,924 A | 8/1991 | Tazi et al. |
| 5,082,913 A | 1/1992 | Tazi et al. |
| 5,114,811 A | 5/1992 | Ebel et al. |
| 5,122,161 A | 6/1992 | Benfaremo et al. |
| 5,126,403 A | 6/1992 | Graiver et al. |
| 5,156,920 A | 10/1992 | Aycock et al. |
| 5,202,384 A | 4/1993 | Pyle et al. |
| 5,212,227 A | 5/1993 | Sakazume et al. |
| 5,219,628 A | 6/1993 | Hathaway et al. |
| 5,225,498 A | 7/1993 | Sorathia et al. |
| 5,244,971 A | 9/1993 | Jean-Marc |
| 5,262,483 A | 11/1993 | Jongeling |
| 5,280,064 A | 1/1994 | Hesp et al. |
| 5,300,569 A | 4/1994 | Drake et al. |
| 5,318,854 A | 6/1994 | Hamersma et al. |
| 5,336,712 A | 8/1994 | Austgen, Jr. et al. |
| 5,356,953 A | 10/1994 | Harada et al. |
| 5,373,048 A | 12/1994 | Witzeman et al. |
| 5,378,560 A | 1/1995 | Tomiyama |
| 5,414,044 A | 5/1995 | Moriya et al. |
| 5,421,982 A | 6/1995 | Ikeda et al. |
| 5,432,662 A | 7/1995 | Kato et al. |
| 5,472,741 A | 12/1995 | Sackmann et al. |
| 5,489,657 A | 2/1996 | Sue et al. |
| 5,494,964 A | 2/1996 | Meichsner et al. |
| 5,494,981 A | 2/1996 | Gorodisher et al. |
| 5,508,334 A | 4/1996 | Chen |
| 5,532,317 A | 7/1996 | Shinmura et al. |
| 5,536,774 A | 7/1996 | Segatta |
| 5,540,767 A | 7/1996 | Ronlan |
| 5,548,031 A | 8/1996 | Doi |
| 5,585,434 A | 12/1996 | DeNicola, Jr. et al. |
| 5,585,436 A | 12/1996 | Niessner et al. |
| 5,602,200 A | 2/1997 | Wissmann |
| 5,618,881 A | 4/1997 | Hojabr |
| 5,634,122 A | 5/1997 | Loucks et al. |
| 5,637,410 A | 6/1997 | Bonner et al. |
| 5,639,574 A | 6/1997 | Hubbard et al. |
| 5,651,927 A | 7/1997 | Auda et al. |
| 5,652,307 A | 7/1997 | Niessner et al. |
| 5,654,364 A | 8/1997 | Bates et al. |
| 5,655,820 A | 8/1997 | Kervagoret |
| 5,658,985 A | 8/1997 | Eichenauer et al. |
| 5,663,234 A | 9/1997 | Kennedy et al. |
| 5,665,820 A | 9/1997 | Leistner et al. |
| 5,670,006 A | 9/1997 | Wilfong et al. |
| 5,684,122 A | 11/1997 | Inoue et al. |
| 5,688,856 A | 11/1997 | Austgen, Jr. et al. |
| 5,691,411 A | 11/1997 | Khouri et al. |
| 5,705,564 A | 1/1998 | Liang et al. |
| 5,708,061 A | 1/1998 | Hesp et al. |
| 5,710,228 A | 1/1998 | Krause et al. |
| 5,730,890 A | 3/1998 | Bickford et al. |
| 5,763,551 A | 6/1998 | Wunsch et al. |
| 5,776,524 A | 7/1998 | Schilling |
| 5,780,531 A | 7/1998 | Scholl |
| 5,783,630 A | 7/1998 | Evans et al. |
| 5,798,413 A | 8/1998 | Spelthann et al. |
| 5,798,414 A | 8/1998 | Mishima et al. |
| 5,821,032 A | 10/1998 | DoMinh |
| 5,847,054 A | 12/1998 | McKee et al. |
| 5,869,695 A | 2/1999 | Ulmer et al. |
| 5,874,185 A | 2/1999 | Wang et al. |
| 5,883,188 A | 3/1999 | Hwang et al. |
| 5,952,126 A | 9/1999 | Lee et al. |
| 5,962,572 A | 10/1999 | Chen |
| 5,962,573 A | 10/1999 | Berta |
| 5,965,300 A | 10/1999 | Lee et al. |
| 5,965,666 A | 10/1999 | Koo et al. |
| 6,025,415 A | 2/2000 | Scholl |
| 6,177,414 B1 | 1/2001 | Tomalia et al. |
| 6,204,354 B1 | 3/2001 | Wang et al. |
| 6,350,800 B1 | 2/2002 | Wang et al. |
| 6,353,054 B1 | 3/2002 | Wang et al. |
| 6,359,064 B1 | 3/2002 | Wang et al. |
| RE37,700 E | 5/2002 | St. Aubyn Hubbard et al. |
| 6,384,134 B1 | 5/2002 | Hall et al. |
| 6,417,259 B1 | 7/2002 | Wang et al. |
| 6,458,881 B1 | 10/2002 | Pan et al. |
| 7,429,393 B2 | 9/2008 | Wang et al. |
| 2002/0188064 A1 | 12/2002 | Wang et al. |

FOREIGN PATENT DOCUMENTS

| | | |
|---|---|---|
| DE | 3430802 | 8/1984 |
| DE | 4225875 | 8/1992 |
| DE | 4239437 | 5/1994 |
| DE | 4241538 | 6/1994 |
| EP | 0322905 | 12/1988 |
| EP | 0346919 | 12/1989 |
| EP | 0408470 | 7/1990 |
| EP | 0440922 | 10/1990 |
| EP | 0509357 | 10/1992 |
| EP | 0536753 | 10/1992 |
| EP | 0563956 | 4/1993 |
| EP | 0728767 | 2/1996 |
| EP | 0949282 | 4/1999 |
| EP | 0959096 | 11/1999 |
| EP | 1088807 | 8/2000 |
| EP | 0949282 | 10/2002 |
| GB | 952151 | 4/1962 |
| GB | 922151 | 3/1963 |
| JP | 60243102 | 5/1984 |
| JP | 04216091 | 8/1992 |
| JP | 6248017 | 2/1993 |
| JP | 06128432 | 5/1994 |
| JP | 8183885 | 10/1994 |
| JP | 8255901 | 3/1995 |
| JP | 9012834 | 6/1995 |
| JP | 9012835 | 6/1995 |
| JP | 11080364 | 3/1999 |
| WO | 9623007 | 1/1996 |
| WO | 9700898 | 1/1997 |

OTHER PUBLICATIONS

Friebe, Lars, Jan. 3, 2011 Supplementary European Search Report from European Patent Application No. 08866297.8 (5 pp.).

Grasmuller, Martin et al., "Synthesis of Poly(Styrene-Co-Butadiene-g-Isobutylene) and Poly(Styrene-Co-Isoprene-g-Isobutylene) Via a Combined Radical/Cationic Route", J. Macromol. Sci.—Pure Appl. Chem., A 39(1&2), pp. 53-61 (2002).

Loveday, Don et al., "Structure and Properties of Butadiene-tert-Butyl Methacrylate and Butadiene/Styrene-tert-Butyl Methacrylate Triblock Copolymer Ionomers", Macromolecules, 28, pp. 7822-7830 (1995).

Nakhmanovich, B.I. et al., "Synthesis of Block Copolymers of Isobutylene with Diene Monomers by the Method of Active Center Transformation", Polymer Science, Ser. A., vol. 41, No. 6, pp. 603-606 (1999).

Matsumoto et al, Synthesis, Thermal Properties, and Gas Permeability of Poly(N-n-alkylmaleimide)s, Polymer Journal, vol. 23, No. 3, Aug. 25, 1990, pp. 201-209.

Chandrasekhar, Polymer Solid Electrolytes: Synthesis and Structure, Advances in Polymer Science, vol. 135, Dec. 1996, pp. 139-205.

Boonstra et al, Reinforcement of Silicone Rubber by Particulate Silica, KGK 29 Jahrgnan, vol. 1, 1976, pp. 29-39.

Haeussler et al, Simultaneous TA and MS analysis of alternating styrene-alei anhydride and styrene-maleimide copolymers, Thermochim Acta 277, 17, 1996—abstract.

Wilkinson, Electric Vehicles Gear Up—Battery Range, cost, and life limitations are gradually being overcome, Chemical & Engineering News, Aug. 13, 1997.

Ciullo et al, The Rubber Formulary, Noyes Publications, 1954, pp. 26-43.

Qi et al, Characterization and ionic conductivity of an amorphous comblike polymer II: Based on ethylene-maleic anyldride copolymer backbone with monoethyl ether of poly(ethylene glycol) of Mw=550 as side chain, European Polymer Journal 35, 1990, pp. 789-793.

Morton, Rubber Technology, 3rd ed., 1987, Chapman & Hall, pp. 284-321.

Gaylord, Free-radical Polymerization of Complexed Monomers. III. The Existence of "Living" Species in the Propagation Step Leading to Alternating Copolymers From Styrene and Methyl Methacrylate, Polymer Letters, vol. 7, 1969, pp. 145-152.

Gaylord, Communications to the Editor—Donor-Acceptor Complexes in Copolymerization. I. Preparation of Styrene-Acrylonitrile Alternating Copolymers in the Presence of Zinc Choloride, Mocromolecules, vol. 2, No. 4, 1969.

Ferch et al, Synthetic Amorphous Silicas in Fine Powder Form: Definitions, Properties and Manufacturing Processes, KGK 49, vol. 9, 1969, pp. 589-596.

Vermeesch et al, Chemical Modification of Poly(styrene-co-maleic anhydride) with Primary N-Alkylamines by Reactive Extrusion, Celestijnenlaaan 200F, 3001, 1994, pp. 1365-1373.

Chimelowiec et al, Alkylation of Silica Surfaces, Journal of Colloid and Interface Science: vol. 94, No. 2, Aug. 1983, pp. 319-327.

Belyakova et al, Surfaces properties of silica gels modified with hydrophonic groups, Colloids and Surfaces A: Physiochemical and Engineering Aspects 154, 1999, pp. 285-294.

Coleman et al, Notes. Reaction of Primary Aliphatic Amines with Maleic Anhydride, J. Org. Chem., 1959, 24 (1), pp. 135-136.

Sanchez et al, Polymers for electrochemical devices, Macromol. Symp. 114, 1997, pp. 85-95.

Nishimoto et al, High Ionic Conductivity of Polyether Based Network Polymer Electrolytes with Hyperbranched Side Chains, Macromolecues 32, 1999, pp. 1541-1548.

Vermeesch et al, Poly(styrene-co-N-maleimide) Copolyers: Preparation by Reactive Extrusion, Molecular Characterization by FTIR, and Use in Blends, Macromolecues 26, 1993, pp. 6643-6649.

Kim et al, Synthesis and photocrosslinking of maleimide-type polymers, Macromol. Rapid Commun. 17, 1996, , pp. 835-841.

Lee et al, Polysulfobetaines and corresponding cationic polymers. Iv. Synthesis and aqueous solution properties of cationic poly(Miqsdmapm), Journal of Applied Polymer Science, vol. 59, No. 4., Jan. 24, 1996, pp. 599-608.

Kita et al, High-quality N-substituted maleimide for heat-resistant methacrylic resin, Journal of Applied Polymer Science, vol. 63, No. 8, Feb. 22, 1997, pp. 1055-1062.

Nakhmanovich et al, Synthesis of Block Copolymers Isobutylene with Diene Monomers by the Method of Acive Center Transformation, Polymer Science Ser. A., vol. 41, No. 6, 1999, pp. 603-606.

Friebe, Supplementary European Search Report, PCT/US2008088449, Jan. 10, 2011.

State Intellectual Property Office, Chinese Office Action, App. No. 200880127357.9, dated Mar. 25, 2013 (6 pages).

* cited by examiner

INTERPOLYMERS CONTAINING ISOBUTYLENE AND DIENE MER UNITS

This application is the National Stage of International Application No. PCT/US08/88449, filed Dec. 29, 2008, which claims priority to U.S. Provisional Application No. 61/017240, filed Dec. 28, 2007, both of which are incorporated herein by reference in their entirety.

FIELD OF THE DISCLOSURE

This disclosure relates to a block interpolymer of diene and butyl polymer, and methods of making the same. These polymers may be used in tire rubber compositions, such as treads and innerliner compounds.

BACKGROUND

For the purpose of retaining the internal pressure of tires, butyl rubber and/or halogenated butyl rubber and the like may be used as a major component of an innerliner. It is also known that butyl rubber may improve the traction properties of a tire tread. However, such butyl rubber may be immiscible with diene rubbers commonly employed in tire rubber compositions. Attempting to blend immiscible components through typical mechanical blending procedures may result in stocks that exhibit phase separation, bleed, and/or have reduced tensile-strength properties. Additionally, butyl rubber compositions may have lower adhesion to diene rubber compositions, and may also have comparably less tack in the uncured state than diene rubber compositions.

Thus, what is needed in the art is a way of compounding butyl rubber with diene rubber, such that the rubbers are more compatible. There is also needed a butyl rubber composition that exhibits improved adhesion to diene rubber containing compositions. Also needed is a butyl rubber composition that exhibits improved tack in the uncured state.

BRIEF SUMMARY OF THE DISCLOSURE

This disclosure relates to a block interpolymer comprising at least one diene block and at least one butyl block, wherein said at least one butyl block comprises residue from a functionalizing agent on at least one end adjacent to said diene block(s).

The disclosure also relates to a rubber composition comprising; (a) a block interpolymer comprising at least one diene block and at least one butyl block, and (b) a filler, wherein said at least one butyl block comprises residue from a functionalizing agent on at least one end adjacent to said diene block(s).

The disclosure also relates to a method of producing a block interpolymer, comprising reacting a functionalized diene polymer with a functionalized butyl polymer.

Furthermore, the disclosure relates to a method of producing a block interpolymer, comprising reacting a living diene polymer with a functionalized butyl polymer.

Other aspects of the present disclosure will be apparent to the ordinarily skilled artisan from the description that follows. To assist in understanding the description of various embodiments that follow, certain definitions are provided immediately below. These are intended to apply throughout unless the surrounding text explicitly indicates a contrary intention:

"polymer" means the polymerization product of one or more monomers and is inclusive of homo-, co-, ter-, tetrapolymers, etc.;

"mer" or "mer unit" means that portion of a polymer derived from a single reactant molecule (e.g., ethylene mer has the general formula —$CH_2CH_2$—);

"copolymer" means a polymer that includes mer units derived from two reactants, typically monomers, and is inclusive of random, block, segmented, graft, etc., copolymers;

"interpolymer" means a polymer that includes mer units derived from at least two reactants, typically monomers, and is inclusive of copolymers, terpolymers, tetrapolymers, and the like;

"butyl polymer" is used herein to represent polyisobutylene and/or polyisobutylene-co-isoprene;

"butyl block" is used herein to represent a block of polyisobutylene and/or polyisobutylene-co-isoprene;

"PIB" represents polyisobutylene; and

"phr" means parts by weight of a referenced material per 100 parts by weight rubber, and is a recognized term by those having skill in the rubber compounding art.

All references incorporated herein by reference are incorporated in their entirety unless otherwise stated.

DETAILED DESCRIPTION

Figure 1:
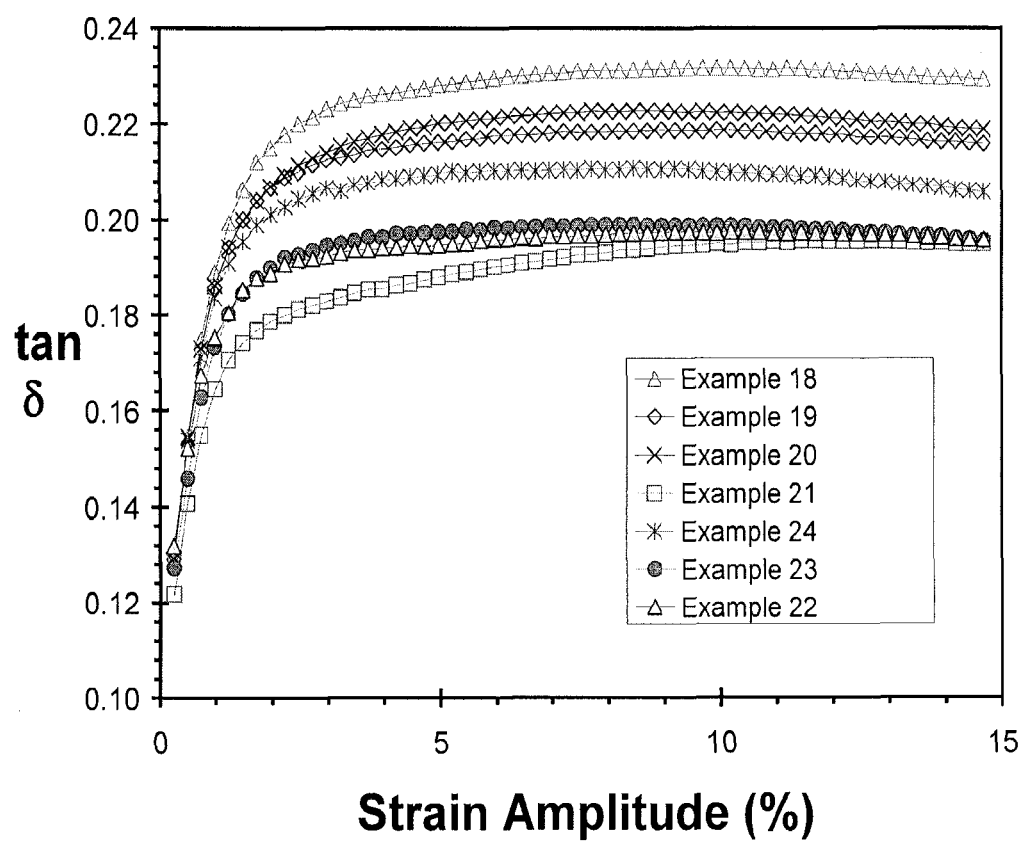
FIG. 1 is a graph of tangent delta versus strain amplitude for Examples 18-24.

This disclosure relates to a block interpolymer comprising at least one diene block and at least one butyl block, wherein said at least one butyl block comprises residue from a functionalizing agent on at least one end adjacent to said diene block(s).

In one embodiment, the block interpolymer of this disclosure may be produced by reacting a living diene polymer with a functionalized butyl polymer.

Suitable diene monomers for forming the diene block include, but are not limited to, $C_4$-$C_{12}$ dienes, particularly conjugated dienes, such as 1,3-butadiene, isoprene, 1,3-pentadiene, 2,3-dimethyl-1,3-butadiene, and 1,3-hexadiene. Mixtures of two or more dienes may also be utilized. The polymeric chain also can include pendent aromatic groups such as can be provided through incorporation of mer units derived from vinyl aromatics, particularly the $C_8$-$C_{20}$ vinyl aromatics such as, e.g., styrene, α-methyl styrene, p-methyl styrene, the vinyl toluenes, and the vinyl naphthalenes. When used in conjunction with one or more dienes, mer units with pendent aromaticity can constitute from about 1 to about 50% by wt., from about 10 to about 45% by wt., or from about 20 to about 35% by wt., of the polymer chain; such interpolymers constitute one exemplary class of polymers. The microstructure of such interpolymers can be random, i.e., the mer units derived from each type of constituent monomer preferably do not form blocks and, instead, are incorporated in a non-repeating, essentially random manner.

Diene polymers can be made by emulsion polymerization, solution polymerization or bulk polymerization. Solution polymerizations have been performed since about the mid-20th century, and the general aspects thereof are known to the ordinarily skilled artisan; nevertheless, certain aspects are provided here for convenience of reference.

Solution polymerization typically involves an initiator, such as a monofunctional initiator, i.e., initiators capable of forming polymers with one living end. Exemplary monofunctional initiators include, but are not limited to, organolithium compounds, particularly alkyllithium compounds. Examples of monofunctional organolithium initiators include, but are not limited to, N-lithio-hexamethyleneimine; n-butyllithium; tributyltin lithium; dialkylaminolithium compounds such as dimethylaminolithium, diethylamino-lithium, dipropylaminolithium, dibutylaminolithium and the like; dialkylaminoalkyl-lithium compounds such as diethylaminopropyl-lithium; and those trialkyl stanyl lithium compounds involving $C_1$-$C_{12}$, preferably $C_1$-$C_4$, alkyl groups.

Multifunctional initiators, i.e., initiators capable of forming polymers with more than one living end, also can be used. Examples of multifunctional initiators include, but are not limited to, 1,4-dilithiobutane, 1,10-dilithiodecane, 1,20-dilithioeicosane, 1,4-dilithiobenzene, 1,4-dilithionaphthalene, 1,10-dilithioanthracene, 1,2-dilithio-1,2-diphenylethane, 1,3,5-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, and 4,4-dilithiobiphenyl.

In addition to organolithium initiators, so-called functionalized initiators also can be useful. These become incorporated into the polymer chain, thus providing a functional group at the initiated end of the chain. Examples of such materials include lithiated aryl thioacetals (see, e.g., WO 2004/041870) and the reaction products of organolithium compounds and, for example, N-containing organic compounds such as substituted aldimines, ketimines, secondary amines, etc., optionally pre-reacted with a compound such as diisopropenyl benzene (see, e.g., U.S. Pat. Nos. 5,153,159 and 5,567,815).

The initiator is employed in an amount designed to result in the desired molecular weight of the polymer. The ratio of millimoles of the initiator per hundred grams of the diene monomer ranges between 0.1 millimoles to 100 millimoles, or between 0.2 millimoles to 20 millimoles, or between 0.5 millimoles to 4 millimoles.

Useful polymerization solvents include various cyclic and acyclic alkanes as well as their alkylated derivatives, certain liquid aromatic compounds, and mixtures thereof. The ordinarily skilled artisan is aware of other useful solvent options and combinations.

In solution polymerizations, both the vinyl content (i.e., 1,2-microstructure) and randomization of the mer units can be increased through inclusion of a coordinator, usually a polar compound, in the polymerization ingredients. Up to 90 or more equivalents of coordinator can be used per equivalent of initiator, with the amount depending on, e.g., the amount of vinyl content desired, the level of non-diene monomer employed, the reaction temperature, and nature of the specific coordinator employed. Compounds useful as coordinators include organic compounds having a heteroatom with a non-bonded pair of electrons (e.g., O or N). Examples include dialkyl ethers of mono- and oligo-alkylene glycols; crown ethers; tertiary amines such as tetramethylethylene diamine; THF; THF oligomers; linear and cyclic oligomeric oxolanyl alkanes such as 2,2-di(tetrahydrofuryl)propane, di-piperidyl ethane, hexamethylphosphoramide, N,N'-dimethylpiperazine, diazabicyclooctane, diethyl ether, tributylamine, and the like. Details of linear and cyclic oligomeric oxolanyl coordinators can be found in, e.g., U.S. Pat. No. 4,429,091.

Although the ordinarily skilled artisan understands the type of conditions typically employed in solution polymerization, a representative description is provided for the convenience of the reader. The following is based on a batch process, although extending this description to, e.g., semi-batch or continuous processes is within the capability of the ordinarily skilled artisan.

Solution polymerization typically begins by charging a blend of monomer(s) and solvent to a suitable reaction vessel, followed by addition of a coordinator (if used) and initiator, which often are added as part of a solution or blend; alternatively, monomer(s) and coordinator can be added to the initiator. The procedure typically is carried out under anhydrous, anaerobic conditions. The reactants can be heated to a temperature of up to about 150° C. and agitated. After a desired degree of conversion has been reached, the heat source (if used) can be removed. At this point, the reaction mixture commonly is referred to as a "polymer cement" because of its relatively high concentration of living polymer.

The diene polymer has a number average molecular weight (Mn) of from about 5,000 to about 2,000,000, in other embodiments from about 15,000 to about 550,000, in other embodiments from about 100,000 to about 300,000, in other embodiments from about 50,000 to about 120,000, and in other embodiments from about 15,000 to about 50,000 as determined by using gel permeation chromatography (GPC) calibrated with polystyrene standards and Mark-Houwink constants for polybutadiene or styrene-butadiene rubber. The polydispersity of the diene polymer may be from about 1.0 to about 5.0, and in other embodiments from about 1.0 to about 2.0.

Alternatively, the living diene polymer may be a pseudo-living diene polymer. As is well known to those skilled in the art, pseudo-living diene polymers can be formed by initiating diene monomers with a coordination catalyst system, such as, for example, a lanthanide-based catalyst system. This type of pseudo-living polymerization is shown in, for example, U.S. Pat. No. 6,699,813, which is hereby incorporated by reference in its entirety.

For example, a lanthanide-based coordination catalyst composition may be formed by combining (a) a lanthanide compound, (b) an alkylating agent, (c) a nickel-containing compound, and (d) a halogen-containing compound.

Various lanthanide compounds or mixtures thereof can be employed as ingredient (a) of the coordination catalyst composition. Preferably, these compounds are soluble in hydrocarbon solvents such as aromatic hydrocarbons, aliphatic hydrocarbons, or cycloaliphatic hydrocarbons. Hydrocarbon-insoluble lanthanide compounds, however, can be suspended in the polymerization medium to form the catalytically active species and are also useful.

Lanthanide compounds include at least one atom of lanthanum, neodymium, cerium, praseodymium, promethium, samarium, europium, gadolinium, terbium, dysprosium, holmium, erbium, thulium, ytterbium, lutetium, and didymium. Preferably, these compounds include neodymium, lanthanum, samarium, or didymium. Didymium is a commercial mixture of rare-earth elements obtained from monazite sand.

The lanthanide atom in the lanthanide compounds can be in various oxidation states including but not limited to the 0, +2, +3, and +4 oxidation states. Trivalent lanthanide compounds, where the lanthanide atom is in the +3 oxidation state, are preferred. Suitable lanthanide compounds include, but are not limited to, lanthanide carboxylates, lanthanide organophosphates, lanthanide organophosphonates, lanthanide organophosphinates, lanthanide carbamates, lanthanide dithiocarbamates, lanthanide xanthates, lanthanide β-diketonates, lanthanide alkoxides or aryloxides, lanthanide halides, lanthanide pseudo-halides, lanthanide oxyhalides, and organolanthanide compounds.

Various alkylating agents, or mixtures thereof, can be used as component (b) of the coordination catalyst composition. Alkylating agents, which may also be referred to as hydrocarbylating agents, are organometallic compounds that can transfer hydrocarbyl groups to another metal. Typically, these agents are organometallic compounds of electropositive metals such as Groups 1, 2, and 3 metals (Groups IA, IIA, and IIIA metals). Preferred alkylating agents include organoaluminum and organomagnesium compounds. Where the alkylating agent includes a labile halogen atom, the alkylating agent may also serve as the halogen-containing compound.

Various nickel-containing compounds or mixtures thereof can be employed as ingredient (c) of the coordination catalyst composition. Preferably, these nickel-containing compounds are soluble in hydrocarbon solvents such as aromatic hydrocarbons, aliphatic hydrocarbons, or cycloaliphatic hydrocarbons. Hydrocarbon-insoluble nickel-containing compounds, however, can be suspended in the polymerization medium to form the catalytically active species and are also useful.

The nickel atom in the nickel-containing compounds can be in various oxidation states including but not limited to the 0, +2, +3, and +4 oxidation states. Divalent nickel compounds, where the nickel atom is in the +2 oxidation state, are preferred. Suitable nickel-containing compounds include, but are not limited to, nickel carboxylates, nickel organophosphates, nickel organophosphonates, nickel organophosphinates, nickel carbamates, nickel dithiocarbamates, nickel xanthates, nickel β-diketonates, nickel alkoxides or aryloxides, nickel halides, nickel pseudo-halides, nickel oxyhalides, and organonickel compounds.

Various compounds, or mixtures thereof, that contain one or more labile halogen atoms can be employed as ingredient (d) of the coordination catalyst composition. These compounds may simply be referred to as halogen-containing compounds. Examples of halogen atoms include, but are not limited to, fluorine, chlorine, bromine, and iodine. A combination of two or more halogen atoms can also be utilized. Halogen-containing compounds that are soluble in a hydrocarbon solvent are preferred. Hydrocarbon-insoluble halogen-containing compounds, however, can be suspended in the oligomerization medium to form the catalytically active species, and are therefore useful.

Useful types of halogen-containing compounds include, but are not limited to, elemental halogens, mixed halogens, hydrogen halides, organic halides, inorganic halides, metallic halides, organometallic halides, and mixtures thereof.

In the coordination catalyst composition described above, the molar ratio of the nickel-containing compound to the lanthanide compound (Ni/Ln) can be varied from about 0.001:1 to about 1:1, more preferably from about 0.005:1 to about 0.5:1, and even more preferably from about 0.01:1 to about 0.2:1. The molar ratio of the alkylating agent to the lanthanide compound (alkylating agent/Ln) can be varied from about 1:1 to about 200:1, more preferably from about 2:1 to about 100:1, and even more preferably from about 5:1 to about 50:1. The molar ratio of the halogen-containing compound to the lanthanide compound (halogen atom/Ln) can be varied from about 0.5:1 to about 20:1, more preferably from about 1:1 to about 10:1, and even more preferably from about 2:1 to about 6:1. The term molar ratio, as used herein, refers to the equivalent ratio of relevant components of the ingredients, e.g., equivalents of halogen atoms on the halogen-containing compound to lanthanide atoms on the lanthanide compound.

The coordination catalyst composition described above may be formed by combining or mixing the catalyst ingredients (a), (b), (c), and (d). Although an active catalyst species is believed to result from this combination, the degree of interaction or reaction between the various ingredients or components is not known with any great degree of certainty. Therefore, the term "catalyst composition" has been employed to encompass a simple mixture of the ingredients, a complex of the various ingredients that is caused by physical or chemical forces of attraction, a chemical reaction product of the ingredients, or a combination of the foregoing.

To form the block interpolymer of the disclosure, according to one embodiment, the living diene polymer may be reacted with a functionalized butyl rubber. A functionalized polymer is a polymer that includes a functional group. Generally, as used herein, a functional group is defined as a group other than an alkyl group which will be capable of associating with another functional group of another molecule, polymer, or filler to form a linkage or a more compatible blend. Functionalized polymers may be prepared by reacting monomer or polymer with a functional compound that results in the insertion or attachment of the desired functional group to the polymer chain.

The functionalized butyl polymer should contain functionality on at least one chain end. Besides the chain ends, the polymer may also contain functional groups at various points along the polymer backbone. Functional groups may be added along the polymer backbone, for example, by using a small amount of diene monomers when polymerizing the butyl monomer, and further reacting the diene with a functional group. Another method of incorporating functional groups along the butyl polymer backbone is to use a functional monomer, such as maleic anhydride when polymerizing the butyl monomer.

The functional group(s) present on the butyl polymer should be capable of reacting or interacting with the living end(s) of the diene polymer. Suitable functional groups include, but are not limited to, hydroxyl, carboxyl, carbonyl, alkoxy, alkoxycarbonyl, cyano, amino, amido, imido, mercapto, carbamoyl, azido, ester, ether, urethane, peroxide, imidazolyl, and pyridine groups, as well as derivatives of those groups. When the butyl polymer contains multiple functional groups, the same functional group may be present in the polymer, or different functional groups may be present. In one embodiment, the butyl polymer contains anhydride functionality. Suitable anhydride functionality may be derived from succinic anhydride, octenyl succinic anhydride, alkenyl succinic anhydride (ASA), malic anhydride, maleic anhydride, mixtures thereof and the like.

The functionalized butyl polymer has a molecular weight that typically ranges from about 100 to about 1,000,000. Alternatively, the molecular weight ranges from about 1000 to about 100,000. Alternatively, the molecular weight ranges from about 1000 to about 5000. The butyl polymer is preferably in a liquid state at 23° C.

A maleic anhydride-functionalized polyisobutylene may be prepared by reacting an isobutylene monomer with a maleic anhydride monomer. The amount of isobutylene units and maleic anhydride units will vary depending on the desired functionality of the resulting polymer. Typically, maleic anhydride units will range from about 5 to 99 mole percent and the isobutylene units will range from 1 to 95 mole percent. The co-monomers, in this case maleic anhydride and isobutylene, can be randomly or alternatingly distributed in the chain. It may be preferable to have the co-monomers alternating along the polymer backbone chain thus producing more functionality in the polymer. This, in turn, provides greater ability for the functionalized polymer to interact with the filler of a rubber composition, which is a preferred feature of the functionalized polymer.

Alternatively, a functionalized butyl polymer may be purchased commercially if available. For example, polyisobutylene succinic anhydride is commercially available from Chevron Chemicals under the trade name OLOA 15500.

The functional group of the functionalized butyl polymer may be further functionalized by reacting the functional group with a compound that has the ability to impart a different functionality to the polymer. For instance, the anhydride-functionalized polyisobutylene may be further functionalized by reacting the polymer with another compound such as an amine. As is well known in the art, when a primary amine reacts with an anhydride, an imide is formed in an imidization reaction. See U.S. Pat. No. 6,133,354, herein incorporated by reference in its entirety. Thus, reacting the anhydride-functionalized polymer with an amine will produce an imide-functionalized polymer. If the starting monomer is isobutylene, then the imide-functionalized polymer will be an imide-functionalized polyisobutylene, which is a preferred functionalized polymer. Of course, an amine can be reacted with other functional polymers, just as other compounds besides amines may be reacted with the functional polymer.

The amine is preferably a primary amine that contains a functionalized group. It should be noted that alkyl amines, while containing no additional functional group, are also acceptable provided that some functionality remains on the polymer post reaction. A preferred amine has the formula $H_2N-(CH_2)_x-A$, where x is an integer ranging from 0-60, and A is a functional group. Suitable functional groups for A include hydroxyl, carboxyl, carbonyl, alkoxy, alkoxycarbonyl, cyano, amino, amido, imido, mercapto, carbamoyl, azido, ester, ether, urethane, peroxide, imidazolyl, and pyridine groups, as well as derivatives of those groups. Preferably, x ranges from 1-18, and more preferably from 1-6. While the $CH_2$ linking chain represents a straight-chain, unsaturated alkylene group connecting the amine with the functional group, the linking chain may be also contain a substituted and/or branched alkylene group. The functional group on the amine is preferably a secondsondary amino group. Most preferably, the amine is 3-(dimethylamino)propylamine.

The imide-functionalized polyisobutylene will carry both the imide functionality and the functionalized group imparted by the amine. If 3-(dimethylamino)propylamine is reacted with the anhydride-functionalized polyisobutylene, the resulting functionalized polymer will carry both the imide and amido functionalities. Such a functionalized polymer is preferred because of its increased ability to interact with the filler in the rubber composition.

The reaction between an anhydride-functionalized polymer and an amine to form the imide-functionalized polymer is preferably carried out at a temperature ranging from room temperature to about 300° C., under substantially dry conditions. The reactants are preferably mixed in their solid state, i.e., dry mixed in the absence of solvents in a suitable mixing apparatus including an internal mixer such as a Brabender mixer or twin-screw extruder, The mixer is preferably purged with a non-reactive gas such as $N_2$ nitrogen prior to charging the reactants. Reaction time typically ranges from 10 minutes to 10 hours, with vigorous mixing preferably occurring for at least one hour. The amine may be added in a single charge or in sequential partial charges into the reactor containing anhydride-functionalized polymer. Preferably the amine is charged in a ratio between 0.8 to 1.0 moles of amine per units derived from the anhydride of the anhydride-functionalized polymer. It is believed that a chemical reaction occurs when a substantial temperature increased is observed, for example, a temperature increase from 23° to 65° C. After the reaction occurs, the material may be dehydrated in a vacuum under dehydration conditions, for instance, at temperatures of 100° C. or above for 12 or more hours.

In the above-described embodiment, reacting the functionalized butyl polymer with a living diene polymer that was initiated with a monofunctional initiator will provide a diblock interpolymer that contains a diene block and a butyl block. Reacting the functionalized butyl polymer with a living diene polymer that was initiated with a multifunctional initiator will provide an interpolymer having a diene block and at least two butyl blocks. For example, a diene polymer initiated with a difunctional initiator will provide a triblock interpolymer that contains a diene block and two butyl blocks (butyl block-diene block-butyl block). Furthermore, reacting a living diene polymer with a functionalized butyl polymer that contains functionality at both chain ends, or alternatively, at one chain end and along the polymer backbone, will provide an interpolymer having at least two diene blocks and a butyl block. In any case, the butyl block(s) will contain residue from a functionalizing agent, where the residue is on at least one end adjacent to the diene block(s). In other words, the residue from the functionalizing agent is attached to the butyl block(s) and is between the butyl block(s) and diene block(s). In one embodiment, the residue from the functionalizing agent is capable of interacting with a filler such as carbon black and/or silica. By "interacting with a filler," it is meant that one or more physical and/or viscoelastic properties will be improved. For example, the modulus may be increased, or the tangent delta (hysteresis) may be decreased The living diene polymer and functionalized butyl polymer may be reacted by adding the functionalized butyl polymer to the living diene polymer. The living diene polymer and functionalized butyl polymer may be reacted for about 10 minutes up to about one hour, and at a temperature of about 72° C. to about 160° C. After the functionalized butyl polymer and living diene polymer are allowed to react, the polymer may be terminated with a terminating agent. Active hydrogen compounds such as water or alcohol are non-limiting examples of suitable terminators.

In another embodiment, the block interpolymer of this disclosure may be produced by reacting a functionalized diene polymer with a functionalized butyl polymer. Suitable functionalized butyl polymers are described above. The functional group(s) present on the butyl polymer should be capable of reacting or interacting with the functional group(s) present on the functionalized diene polymer.

Suitable diene monomers for forming the functionalized diene polymer include those mentioned above in paragraph 0024.

A functionalized diene polymer may be prepared by using a functional initiator that provides functionality at the head of the polymer chain. Such initiators are well known to the skilled artisan. Examples of such initiators include lithiated aryl thioacetals (see, e.g., WO 2004/041870, incorporated herein by reference) and the reaction products of organolithium compounds and, for example, N-containing organic compounds such as substituted aldimines, ketimines, secondsondary amines, etc., optionally pre-reacted with a compound such as diisopropenyl benzene (see, e.g., U.S. Pat. Nos. 5,153, 159 and 5,567,815, both of which are incorporated herein by reference). The functionalized diene polymer may also be prepared by attaching a functional group to the tail end of an anionically-polymerized diene polymer by terminating a living diene polymer with a functionalized compound. As a skilled artisan can readily appreciate, an anionically-polymerized diene polymer initiated with a monofunctional initiator and terminated with a functionalized compound will bear one functional end group. Likewise, an anionically-polymerized diene polymer initiated with a multifunctional initiator and terminated with a functionalized compound will bear multiple functional end groups. For example, a diene polymer initiated with a difunctional initiator and terminated with a functional compound will typically bear two functional end groups. Alternatively, diene monomer can be polymerized with a coordination catalyst system, such as a lanthanide-based catalyst system, to form a pseudo-living polymer, and this polymer can then be functionalized by reaction with a functional compound. Pseudo-living polymerization of diene monomers is described above. Moreover, functional groups may be imparted along the diene polymer backbone by polymerizing functionalized monomers. The functionalized monomers may be functional diene monomers, functional monomers capable of copolymerizing with diene monomers, or a combination of both.

Useful functionalizing agents include those conventionally employed in the art. Types of compounds that have been used to end-functionalize living polymers include carbon dioxide, benzophenones, benzaldehydes, imidazolidones, pyrolidinones, carbodiimides, ureas, isocyanates, amines and Schiff bases including those disclosed in U.S. Pat. Nos. 3,109,871, 3,135,716, 5,332,810, 5,109,907, 5,210,145, 5,227,431, 5,329,005, 5,935,893, which are incorporated herein by reference. Specific examples include trialkyltin halides such as triisobutyltin chloride, as disclosed in U.S. Pat. Nos. 4,519, 431, 4,540,744, 4,603,722, 5,248,722, 5,349,024, 5,502,129, and 5,877,336, which are incorporated herein by reference. Other examples include cyclic amino compounds such as hexamethyleneimine alkyl chloride, as disclosed in U.S. Pat. Nos. 5,786,441, 5,916,976 and 5,552,473, which are incorporated herein by reference. Other examples include N-substituted aminoketones, N-substituted thioaminoketones, N-substituted aminoaldehydes, and N-substituted thioaminoaldehydes, including N-methyl-2-pyrrolidone or dimethylimidazolidinone (i.e., 1,3-dimethylethyleneurea) as disclosed in U.S. Pat. Nos. 4,677,165, 5,219,942, 5,902,856, 4,616,069, 4,929,679, 5,115,035, and 6,359,167, which are incorporated herein by reference. Additional examples include sulfur-containing or oxygen containing azaheterocycles such as disclosed in WO 2004/020475, U.S. Ser. No. 11/331,663 and U.S. Pat. No. 6,596,798, which are incorporated herein by reference. Other examples include boron-containing terminators such as disclosed in U.S. Ser. No. 60/591,065, which is incorporated herein by reference. Still other examples include cyclic siloxanes such as hexamethylcyclotrisiloxane, including those disclosed in International Publication No. WO2006/047328, which is incorporated herein by reference. Further, examples include α-halo-ω-amino alkanes, such as 1-(3-bromopropyl)-2,2,5,5-tetramethyl-1-aza-2,5-disilacyclopentane, including those disclosed International Publication No. WO2006/050486, which is incorporated herein by reference.

The functionalized diene polymer may comprise carbonyl functionality as described in U.S. Publication No. 2007-0078232, which is incorporated herein by reference. In a further embodiment, the carbonyl functionality is derived from 1-(trimethylsilyl)-2-pyrrolidinone.

The functionalized diene polymer may comprise multiple functionality as disclosed in U.S. Publication. No. 2006-0135701, which is incorporated herein by reference. In one embodiment, the functionality derives from 1-(3-bromopropyl)-2,2,5,5-tetramethyl-1-aza-2,5-disilacyclopentane.

In another embodiment, the functionalized diene polymer may include a hydrazone functionality, as disclosed in U.S. Ser. No. 11/877,105, which is incorporated herein by reference. The hydrazone functionality can be provided by reacting a carbanionic (living) polymer with a hydrazone compound. In one embodiment, the hydrazone functionality is derived from cyclohexanecarboxaldehyde piperidine hydrazone.

Suitable functional monomers include, but are not limited to, acrylamide, methacrylamide, 4-vinylaniline, aminomethyl(metha)acrylate, aminoethyl(metha)acrylate, aminopropyl (metha)acrylate, aminobutyl(metha)acrylate, anilinostyrenes such as anilinostyrene, β-phenyl-p-anilinostyrene, β-cyano-p-anilinostyrene, β-cyano-β-methyl-p-anilinostyrene, β-chloro-p-anilinostyrene, β-carboxy-p-anilinostyrene, β-methoxycarbonyl-p-anilinostyrene, β-(2-hydroxyethoxy) carbonyl-p-anilinostyrene, β-formyl-p-anilinostyrene, β-formyl-β-methyl-p-anilinostyrene, α-carboxy-β-carboxy-β-phenyl-p-anilinostyrene and the like, anilinophenyl butadienes such as 1-anilinophenyl-1,3-butadiene, 1-anilinophenyl-3-methyl-1,3-butadiene, 1-anilinophenyl-3-chloro-1,3-butadiene, 3-anilinophenyl-2-methyl-1,3-butadiene, 1-anilinophenyl-2-chloro-1,3-butadiene, 2-anilinophenyl-1,3-butadiene, 2-anilinophenyl-3-methyl-1,3-butadiene, 2-anilinophenyl-3-chloro-1,3-butadiene and the like, and N-monosubstituted, hydroxyalkyl(metha)acrylates such as 2-hydroxyethyl(metha)acrylate, hydroxyl group-containing vinylaromatic compounds such as o-hydroxystyrene, m-hydroxystyrene, p-hydroxystyrene, o-hydroxy-α-methylstyrene, m-hydroxy-α-methylstyrene, p-hydroxy-α-methylstyrene, p-vinylbenzyl alcohol and the like. Others are known to those skilled in the art.

The functionalized diene polymer has a number average molecular weight (Mn) of from about 5,000 to about 2,000, 000, in other embodiments from about 15,000 to about 550, 000, in other embodiments from about 100,000 to about 300, 000, in other embodiments from about 50,000 to about 120, 000, and in other embodiments from about 15,000 to about 50,000 as determined by using gel permeation chromatography (GPC) calibrated with polystyrene standards and Mark-Houwink constants for polybutadiene. The polydispersity of the functionalized diene polymer may be from about 1.0 to about 5.0, and in other embodiments from about 1.0 to about 2.0.

In the above-described embodiment, reacting the functionalized butyl polymer with a functionalized diene polymer that contains one functional end group will provide a diblock interpolymer that contains a diene block and a butyl block. The residue from the functionalizing agent will interact and/or react with each other and will be between the diene block and the butyl block. Reacting the functionalized butyl polymer with a functionalized diene polymer that contains residue from a functionalizing agent on more than one end will provide an interpolymer having a diene block and at least two butyl blocks. For example, a functionalized diene polymer that contains residue from a functionalizing agent on two ends will provide a triblock interpolymer that contains a diene block and two butyl blocks (butyl block-diene block-butyl block). As with the diblock interpolymer, the residue from the functionalizing agents will interact and/or react with each other and will be between the diene block and the butyl blocks. Additionally, reacting a functionalized diene polymer with a functionalized butyl polymer that contains functionality at both chain ends, or alternatively, at one chain end and along the polymer backbone, will provide an interpolymer having at least two diene blocks and a butyl block. Reacting a functionalized diene polymer that contains functionality along the polymer backbone with a functionalized butyl polymer will result in an interpolymer having a diene backbone with pendant butyl blocks. As described above, functional groups may be imparted along the diene polymer backbone by polymerizing functionalized monomers. In any case, the butyl block(s) and diene blocks(s) will contain residue from a functionalizing agent, where the residues from the butyl block(s) and diene block(s) are adjacent to each other. In other words, the residues from the functionalizing agents are between the butyl block(s) and the diene block(s). In one embodiment, at least one of the residues from the functionalizing agents is capable of interacting with a filler such as carbon black and/or silica.

In one embodiment, the functionalized diene polymer and functionalized butyl polymer are mixed in their solid state, i.e., dry mixed in the absence of solvents in a suitable mixing apparatus such as a brabender or banbury mixer. Mix time typically ranges from 1 minute to 10 hours, in certain embodiments ranging from 2 minutes to 1 hour. Other suitable mixing methods include melt mixing, which includes mixing and dynamically heat-treating the components, and other known methods in the art. Conventional equipment for mixing the components, such as an open-type mixing roll, closed-type Banbury mixer, closed type Brabender mixer, extruding machine, kneader, continuous mixer, etc., is acceptable. In one embodiment, the closed-type Brabender mixer is used, and mixing in an inactive gas environment, such as $N_2$ or Ar, is also used.

The block interpolymers of this disclosure may comprise 1-99 mole % of diene mer units and 1-99 mole % of butyl mer units, or alternatively 50-90 mole % of diene mer units and 10-50 mole % of butyl mer units, or alternatively 70-90 mole % of diene mer units and 10-30 mole % of butyl mer units, or alternatively 80 mole % diene mer units and 20 mole % butyl mer units.

The resulting diene and butyl block interpolymers of this disclosure are particularly useful in preparing rubber compositions that may be used, for example, as tire components, such as innerliner, treads, subtreads, black sidewalls, body ply skins, bead filler, and the like. For example, the block interpolymers having diene blocks with higher number average molecular weights (e.g., about 50,000 or greater) can be used alone or together with other rubbery polymers as the rubber component of a rubber composition. In one or more embodiments, these rubber compositions may include from about 1% to about 100% by weight, in other embodiments from about 10% to about 90% by weight, and in other embodiments from about 15% to 60% by weight of the block interpolymer based on the total weight of the rubber within the formulation. Other rubbery polymers that may be used include natural and synthetic elastomers. Useful rubbery polymers include natural rubber, synthetic polyisoprene, polybutadiene, halogenated and/or unhalogenated polyisobutylene, halogenated and/or unhalogenated polyisobutylene-co-isoprene, neoprene, poly(ethylene-co-propylene), poly(styrene-co-butadiene), poly(styrene-co-isoprene), and poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof. These elastomers can have a myriad of macromolecular structures including linear, branched and star shaped. In one embodiment, the rubbery polymer is butyl rubber, in another embodiment the rubbery polymer is halobutyl rubber. Other ingredients that are typically employed in rubber compounding may also be added.

The block interpolymers of this disclosure having diene blocks with lower number average molecular weights (e.g, about 50,000 or less) may be used as extenders for polymers and/or rubber compositions, either alone or as a partial substitute for conventional extenders.

Typical prior art extenders replaced by the block interpolymers of this disclosure include extender oils and low molecular weight compounds or components. Such extender oils include those well known in the art such as naphthenic, aromatic and paraffinic petroleum oils and silicone oils. Examples of low molecular weight organic compounds or components as extenders in the compositions that may be replaced by the block interpolymers of the present disclosure are low molecular weight organic materials having a number-average molecular weight of less than 50,000, preferably less than 20,000, more preferably less than 10,000, and most preferably less than 5,000.

Although there is no particular limitation to the extender material that the present block interpolymers may replace in prior art rubber compounds, the following is a list of examples of appropriate replaceable materials or extenders: (1) softening agents, namely aromatic, naphthenic and paraffinic oil softening agents for rubbers or resins; and (2) plasticizers, namely plasticizers composed of esters including phthalic, mixed phthalic, aliphatic dibasic acid, glycol, fatty acid, phosphoric and stearic esters, epoxy plasticizers, other plasticizers for plastics; and (3) petroleum hydrocarbons, namely synthetic terpene resins, aromatic hydrocarbon resins, aliphatic hydrocarbon resins, aliphatic cyclic hydrocarbon resins, aliphatic or alicyclic petroleum resins, aliphatic or aromatic petroleum resins, polymers of unsaturated hydrocarbons, and hydrogenated hydrocarbon resins. The present block interpolymers can be used to replace or partially replace one or more or all of these extenders.

If used as an extender, the block interpolymers of the present disclosure may be added to a rubber composition in an amount of about 1 to 1,000 phr, or from about 1 to about 500 phr, or from about 1 to about 30 phr.

The rubber compositions containing the block interpolymers of the disclosure (whether as a rubber component, an extender, or both) may include fillers such as inorganic and organic fillers. The organic fillers include carbon black and starch. The inorganic fillers may include silica, aluminum hydroxide, magnesium hydroxide, clays (hydrated aluminum silicates), and mixtures thereof. The total amount of filler may be from about 1 to about 200 phr, or alternatively from about 5 to about 100 phr, or alternatively from about 30 to about 80 phr, or from about 40 to 70 phr.

If used, the carbon black may be present in an amount of about 1 to about 200 phr, or alternatively in an amount of about 5 to about 100 phr, or alternatively in an amount of 30 to about 80 phr. Suitable carbon blacks include commonly available, commercially-produced carbon blacks, but those having a surface area of at least 20 m2/g, or preferably, at least 35 m2/g up to 200 m2/g or higher are preferred. Among useful carbon blacks are furnace black, channel blacks, and lamp blacks. A mixture of two or more of the above blacks can be used. Exemplary carbon blacks include, but are not limited to, N-110, N-220, N-339, N-330, N-352, N-550, N-660, as designated by ASTM D-1765-82a.

Examples of reinforcing silica fillers which can be used include wet silica (hydrated silicic acid), dry silica (anhydrous silicic acid), calcium silicate, and the like. Among these, precipitated amorphous wet-process, hydrated silicas are preferred. Silica can be employed in an amount of about 1 to about 100 phr, or alternatively in an amount of about 5 to 80 phr, or alternatively in an amount of about 30 to about 80 phr. The useful upper range is limited by the high viscosity imparted by fillers of this type. Some of the commercially available silicas which can be used include, but are not limited to, HiSil® 190, HiSil® 210, HiSil® 215, HiSil® 233, HiSil® 243, and the like, produced by PPG Industries (Pittsburgh, Pa.). A number of useful commercial grades of different silicas are also available from DeGussa Corporation (e.g., VN2, VN3), Rhone Poulenc (e.g., Zeosil® 1165MP0), and J. M. Huber Corporation.

If silica is used as a filler, it may be desirable to use a coupling agent to couple the silica to the polymer. Numerous coupling agents are known, including but not limited to organosulfide polysulfides and organoalkoxymercaptosilanes. Any organosilane polysulfide may be used.

The amount of coupling agent in the composition is the amount needed to produce acceptable results, which is easily determined by one skilled in the art. The amount of coupling agent is typically based on the weight of the silica in the composition, and may be from about 0.1% to about 20% by weight of silica, or alternatively from about 1% to about 15% by weight of silica, or alternatively from about 1% to about 10% by weight of silica.

A multitude of rubber curing agents (also called vulcanizing agents) may be employed, including sulfur or peroxide-based curing systems. Curing agents are described in Kirk-Othmer, ENCYCLOPEDIA OF CHEMICAL TECHNOLOGY, Vol. 20, pgs. 365-468, (3rd Ed. 1982), particularly Vulcanization Agents and Auxiliary Materials, pgs. 390-402, and A. Y. Coran, Vulcanization, ENCYCLOPEDIA OF POLYMER SCIENCE AND ENGINEERING, (2nd Ed. 1989), which are incorporated herein by reference. Vulcanizing agents may be used alone or in combination.

Other ingredients that may be employed in the rubber composition include accelerators, oils, waxes, scorch inhibiting agents, processing aids, zinc oxide, tackifying resins, reinforcing resins, fatty acids such as stearic acid, peptizers, and one or more additional rubbers.

In one or more embodiments, the vulcanizable rubber composition may be prepared by forming an initial masterbatch that includes the rubber component and filler (the rubber component optionally including the block interpolymer of this disclosure). This initial masterbatch may be mixed at a starting temperature of from about 25° C. to about 125° C. with a discharge temperature of about 135° C. to about 180° C. To prevent premature vulcanization (also known as scorch), this initial masterbatch may exclude vulcanizing agents. Once the initial masterbatch is processed, the vulcanizing agents may be introduced and blended into the initial masterbatch at low temperatures in a final mixing stage, which preferably does not initiate the vulcanization process. Optionally, additional mixing stages, sometimes called remills, can be employed between the masterbatch mixing stage and the final mixing stage. Various ingredients including the block interpolymer of this disclosure can be added during these remills. Rubber compounding techniques and the additives employed therein are generally known as disclosed in The Compounding and Vulcanization of Rubber, in Rubber Technology (2nd Ed. 1973).

Where the vulcanizable rubber compositions are employed in the manufacture of tires, these compositions can be processed into tire components according to ordinary tire manufacturing techniques including standard rubber shaping, molding and curing techniques. Typically, vulcanization is effected by heating the vulcanizable composition in a mold; e.g., it may be heated to about 140 to about 180° C. Cured or crosslinked rubber compositions may be referred to as vulcanizates, which generally contain three-dimensional polymeric networks that are thermoset. The other ingredients, such as processing aides and fillers, may be evenly dispersed throughout the vulcanized network. Pneumatic tires can be made as discussed in U.S. Pat. Nos. 5,866,171, 5,876,527, 5,931,211, and 5,971,046, which are incorporated herein by reference.

In order to demonstrate the practice of the present disclosure, the following examples have been prepared and tested. The examples should not, however, be viewed as limiting the scope of the disclosure. The claims will serve to define the invention. The rubber compositions can be used in all industry fields, in particular, in the fabrication of automotive parts, tires, tire innerliner and tread rubbers, household electrical appliances, industrial machinery, precision instruments, transport machinery, constructions, engineering, medical instruments and tire rubber formulations. The rubber composition can also be used to form other tire components such as subtreads, black sidewalls, body ply skims, bead fillers and the like. When prepared as a tire or a tire component, the rubber composition may be vulcanized in accordance with known vulcanization techniques used to produce tires and tire components.

EXAMPLES

Preparation of Examples 1-4

Butadiene in hexane (22.1 weight percent butadiene), styrene in hexane (33 weight percent styrene), hexane, n-butyl lithium (1.60 M in hexane), oligomeric oxolanyl propanes OOPS (1.60 M solution in hexane, stored over calcium hydride), and butylated hydroxytoluene (BHT) solution in hexane were used as supplied in the reactor room. Commercially available reagents and starting materials (Aldrich) include the following: cyclohexanecarboxaldehyde (98%), 1-Aminopiperidine, (97%), pyridine (99%), 1-(trimethylsilyl)-2-pyrrolidinone (TMSP, 96%), 1-(3-bromopropyl)-2,2,5,5,-tetramethyl-1-aza-2,5-disilacyclopentane (PABr, 97%), which were used as purchased without further purification. The cyclohexanecarboxaldehyde piperidine hydrazone (CAPH) was synthesized as follows:

Cyclohexanecarboxaldehyde (7.4 ml, 60 mmol) and 1-aminopiperidine (6.5 ml, 60 mmol) in pyridine (50 ml) were stirred for 12 hours at room temperature. Pyridine was removed under vacuum distillation and the residue was purified by silica gel column chromatography (eluted with $Et_2O$: hexane 10:90) to yield 11.6 g (98%) as a colorless oil product. $^1$H-NMR ($CDCl_3$): δ 1.23 (m, 4 H), 1.47 (m, 2 H), 1.71 (m, 10 H), 2.19 (m, 1 H), 2.90 (t, J=5.4 Hz, 4H), 6.84 (bs, 1H). $^{13}$C-NMR ($CDCl_3$); δ 23.74 (1 C), 24.83 (2 C), 25.19 (2 C), 25.56 (1 C), 30.66 (2 C), 40.96 (1 C), 52.30 (2 C), 144.54 (1 C).

Example 1

SBR

To a two gallon, $N_2$ purged reactor equipped with a stirrer was added 1.610 kg of hexane, 0.412 kg of 33% (by weight) styrene in hexane, and 2.462 kg of 22.1 wt % butadiene in hexane. The reactor was charged with 3.43 ml of n-BuLi (1.60M) in hexane, and then 1.05 ml of 1.6 M OOPS in hexane, and the reactor jacket was then heated to 50° C. After 24 minutes, the batch temperature peaked at 66.4° C. After an additional 30 minutes, the living cement was dropped into isopropanol that contained about 0.2-1 wt. % of BHT, and the resulting material was drum dried. The base SBR shows the following properties (Mn=number average molecular weight, Mw=weight average molecular weight, Mp=peak molecular weight, PDI=Mw/Mn, Tg=glass transition temperature):

| Example | Mn | Mw | Mp | PDI | % Coupling | Tg (° C.) |
|---|---|---|---|---|---|---|
| 1 | 115705 | 120450 | 124047 | 1.04 | 0.0 | −36.11 |

All molecular weights disclosed herein were determined using Gel Permeation Chromatography ("GPC") using THF as a solvent and calibrated using a polystyrene standard.

Example 2

SBR Functionalized with TMSP

To a two gallon $N_2$ purged reactor equipped with a stirrer was added 1.610 kg of hexane, 0.412 kg of 33 wt % styrene in hexane, and 2.462 kg of 22.1 wt % butadiene in hexane. The reactor was charged with 3.70 ml of n-BuLi (1.60M) in hexane, and then 1.05 ml of 1.6 M OOPS in hexane was charged, and the reactor jacket was then heated to 50° C. After 28 minutes, the batch temperature peaked at 61° C. After an additional 30 minutes, 1 ml of 1-(trimethylsilyl)-2-pyrrolidinone (TMSP, 96%) in 20 ml of hexane was added to the reactor, and reacted at 50° C. for 30 minutes. Then, the resulting polymer cement was dropped into an isopropanol solution that contained about 0.2-1 wt. % of BHT, and the resulting material was drum dried. The polymer shows the following properties:

| Example | Mn | Mw | Mp | PDI | % Coupling | Tg (° C.) |
|---|---|---|---|---|---|---|
| 2 | 114683 | 128644 | 109997 | 1.12 | 18.45 | −37.10 |

Example 3

SBR Functionalized with CAPH

To a two gallon $N_2$ purged reactor equipped with a stirrer was added 1.610 kg of hexane, 0.412 kg of 33 wt % styrene in hexane, and 2.462 kg of 22.1 wt % butadiene in hexane. The reactor was charged with 3.17 ml of n-BuLi (1.60M) in hexane, and then 1.05 ml of 1.6 M OOPS in hexane was charged, and the reactor jacket was then heated to 50° C. After 25 minutes, the batch temperature peaked at 64° C. After an additional 30 minutes, 1.1 ml of cyclohexanecarboxaldehyde piperidine hydrazone (CAPH) in 20 ml of hexane was added to the reactor, and reacted at 50° C. for 30 minutes. Then, the polymer cement was dropped into an isopropanol solution that contained about 0.2-1 wt. % of BHT, and the resulting material was drum dried. The polymer shows the following properties:

| Example | Mn | Mw | Mp | PDI | % Coupling | Tg (° C.) |
|---|---|---|---|---|---|---|
| 3 | 126460 | 133358 | 134096 | 1.05 | 2.5 | −34.28 |

Example 4

SBR Functionalized with $NH_2$

To a two gallon $N_2$ purged reactor equipped with a stirrer was added 1.610 kg of hexane, 0.412 kg of 33 wt % styrene in hexane, and 2.462 kg of 22.1 wt % butadiene in hexane. The reactor was charged with 3.70 ml of n-BuLi (1.60M) in hexane, and then 1.05 ml of 1.6 M OOPS in hexane was charged, and the reactor jacket was then heated to 50° C. After 28 minutes, the batch temperature peaked at 61° C. After an additional 30 minutes, the living cement was removed from the reactor and transferred into the dried 28-oz glass bottles, terminated with 1-(3-bromopropyl)-2,2,5,5-tetramethyl-1-aza-2,5-disilacyclopentane [SBR-N(Si)$_2$] at 50° C. bath for 30 minutes, which was then hydrolyzed with 1% of HCl (in THF) at room temperature for 2 hr, and neutralized with KOH (1.0 N solution) to generate the unprotected amine-polymer [SBR-NH$_2$]. After being drum dried, the polymer showed the following properties:

| Example | Mn | Mw | Mp | PDI | % Coupling | Tg (° C.) |
|---|---|---|---|---|---|---|
| 4 | 78297 | 140732 | 226701 | 1.797 | 83.85 | −36.85 |

SBR-b-PIB Diblock Interpolymer Preparation

Example 5

SBR(TMSP)-b-PIB

A charge of 25 g of the product from the experiment of Example 2 was added to a Brabender mixer (~55 g capacity) equipped with a roller blade and nitrogen purging. The mixer was initially set to 110° C. and 60 rpm. After 30 seconds, a charge of 0.8 g polyisobutylene succinic anhydride (with Mw=1900, Mn=1000, and 95 meq of COOH/100 g, from Chevron Chemicals under the trade name OLOA 15500) was added into the mixer. The material was further mixed at those conditions for 5 minutes; then, the agitation was turned off and the mixture was removed from the mixer. The resulting material was homogenous, integrated and stable.

Example 6

SBR(TMSP)-b-PIB

A charge of 25 g of the product from the experiment of Example 2 was added to a Brabender mixer (~55 g capacity) equipped with a roller blade and nitrogen purging. The mixer was initially set to 110° C. and 60 rpm. After 30 seconds, a charge of 2.7 g polyisobutylene succinic anhydride (with Mw=1900, Mn=1000, and 95 meq of COOH/100 g, from Chevron Chemicals under the trade name OLOA 15500) was added into the mixer. The material was further mixed at those conditions for 5 minutes; then, the agitation was turned off and the mixture was removed from the mixer. The resulting material was homogenous, integrated and stable.

Example 7

SBR(CAPH)-b-PIB

A charge of 25 g of the product from the experiment of Example 3 was added to a Brabender mixer (~55 g capacity) equipped with a roller blade and nitrogen purging. The mixer was initially set to 110° C. and 60 rpm. After 30 seconds, a charge of 0.8 g polyisobutylene succinic anhydride (with Mw=1900, Mn=1000, and 95 meq of COOH/100 g, from Chevron Chemicals under the trade name OLOA 15500) was added into the mixer. The material was further mixed at those conditions for 5 minutes; then, the agitation was turned off and the mixture was removed from the mixer. The resulting material was homogenous, integrated and stable.

Example 8

SBR(CAPH)-b-PIB

A charge of 25 g of the product from the experiment of Example 3 was added to a Brabender mixer (~55 g capacity) equipped with a roller blade and nitrogen purging. The mixer was initially set to 110° C. and 60 rpm. After 30 seconds, a charge of 2.7 g polyisobutylene succinic anhydride (with Mw=1900, Mn=1000, and 95 meq of COOH/100 g, from Chevron Chemicals under the trade name OLOA 15500) was added into the mixer. The material was further mixed at those conditions for 5 minutes; then, the agitation was turned off and the mixture was removed from the mixer. The resulting material was homogenous, integrated and stable.

Example 9

SBR($NH_2$)-b-PIB

A charge of 25 g of the product from the experiment of Example 4 was added to a Brabender mixer (~55 g capacity) equipped with a roller blade and nitrogen purging. The mixer was initially set to 110° C. and 60 rpm. After 30 seconds, a charge of 0.8 g polyisobutylene succinic anhydride (with Mw=1900, Mn=1000, and 95 meq of COOH/100 g, from Chevron Chemicals under the trade name OLOA 15500) was added into the mixer. The material was further mixed at those conditions for 5 minutes; then, the agitation was turned off and the mixture was removed from the mixer. The resulting material was homogenous, integrated and stable.

Example 10

SBR($NH_2$)-b-PIB

A charge of 25 g of the product from the experiment of Example 4 was added to a Brabender mixer (~55 g capacity) equipped with a roller blade and nitrogen purging. The mixer was initially set to 110° C. and 60 rpm. After 30 seconds, a charge of 2.7 g polyisobutylene succinic anhydride (with Mw=1900, Mn=1000, and 95 meq of COOH/100 g, from Chevron Chemicals under the trade name OLOA 15500) was added into the mixer. The material was further mixed at those conditions for 5 minutes; then, the agitation was turned off and the mixture was removed from the mixer. The resulting material was homogenous, integrated and stable.

PIB-b-SBR-b-PIB Triblock Interpolymer Preparation and Evaluation in Rubber Compounds as Rubber Component

Preparation of Examples 11-17

A dried 28-oz or 7-oz glass bottle, which previously had been sealed with extracted septum liners and perforated crown caps under a positive nitrogen purge, was used for all of the preparations. Butadiene in hexane (blend B-89, 21.6 weight percent butadiene), styrene in hexane (styrene blend, 33 weight percent styrene), hexane, n-butyllithium (1.60 M in hexane), 2,2-bis(2'-tetrahydrofuryl)propane solution (1.60 M in hexane, stored over calcium hydride), and di-t-butyl-p-cresol (BHT) solution in hexane (2 wt %) were used as supplied in the reactor room. Commercially available reagents and starting materials include the following: 4,4'-trimethylenedipiperidine (97%, Aldrich), N-benzylidene-methylamine (97%, BMA, Aldrich), 1-(trimethylsilyl)-2-pyrrolidinone (96%, TMSP, Aldrich), 1-methyl-2-pyrrolidinone (99.5%, NMP, Aldrich), which were used as purchased without further purification. The polyisobutylene succinic anhydride (PIBSA) had a Mw=1900, Mn=1000, and 95 meq of COOH/100 g, and was purchased from Chevron Chemicals under the trade name OLOA 15500.

Examples 11-13

To a two gallon $N_2$ purged reactor equipped with a stirrer was added 2.176 kg of hexane, 0.330 kg of 33 wt % styrene in hexane and 1.979 kg of 22.0 wt % butadiene in hexane. The reactor was charged with 3.3 ml of 4,4'-trimethylenedipiperidine solution (1.0 M in toluene) and 4.6 ml of n-BuLi (1.60M) in hexane, followed by the addition of 2.0 ml of 2,2-bis(2'-tetrahydrofuryl)propane solution (1.60 M). The reactor jacket was heated to 50° C. After 28 minutes, the batch temperature peaked at 57.1° C. After an additional 30 minutes, the living cement was removed from the reactor into three dried 28-oz glass bottles.

One third of the cement was coagulated in isopropanol containing about 0.2-1 wt. % of butylated hydroxytoluene (BHT) and drum dried to produce SBR (Example 11).

One third of the cement was combined with a solution of N-benzylidene-methylamine (BMA, 1.0 M in toluene) and agitated at 50° C. for 30 minutes. The cement was coagulated in isopropanol containing about 0.2-1 wt. % of butylated hydroxytoluene (BHT) and drum dried to produce (BMA) SBR(BMA) (Example 12).

One third of the cement was combined with a solution of N-benzylidene-methylamine (BMA, 1.0 M in toluene) and agitated at 50° C. for 30 minutes. A solution of polyisobutylene succinic anhydride (PIBSA, 31.8 wt. % in hexane) was then added and the mixture was agitated at 50° C. for 1 hour. The cement was coagulated in isopropanol containing about 0.2-1 wt. % of butylated hydroxytoluene (BHT) and drum dried to produce PIB-b-(BMA)SBR(BMA)-b-PIB (Example 13).

The properties of Examples 11-13 are shown in Table 1.

Examples 14-17

To a two gallon $N_2$ purged reactor equipped with a stirrer was added 1.984 kg of hexane, 0.239 kg of 33 wt % styrene in hexane and 1.672 kg of 22.0 wt % butadiene in hexane. The reactor was charged with 2.7 ml of 4,4'-trimethylenedipiperidine solution (1.0 M in toluene) and 3.6 ml of n-BuLi (1.60M) in hexane, and followed by the addition of 1.74 ml of 2,2-bis (2'-tetrahydrofuryl)propane solution (1.60 M). The reactor jacket was heated to 50° C. After 30 minutes, the batch temperature peaked at 56° C. After an additional 30 minutes, the living cement was removed from the reactor into four dried 28-oz glass bottles.

One fourth of the cement was reacted with a solution of polyisobutylene succinic anhydride (PIBSA, 31.8 wt. % in hexane) at 50° C. for 60 minutes and coagulated in isopropanol containing about 0.2-1 wt. % of butylated hydroxytoluene (BHT) to yield PIB-b-SBR-b-PIB (Example 14).

One fourth of the cement was terminated (50° C. bath for ~30 minutes) with a solution of 1-(trimethylsilyl)-2-pyrrolidinone (TMSP, 1.0 M in toluene), followed by reacting the cement with a solution of polyisobutylene succinic anhydride (PIBSA, 31.8 wt. % in hexane) at 50° C. for an additional 60 minutes. The polymer cement was coagulated in isopropanol containing about 0.2-1 wt. % of butylated hydroxytoluene (BHT) and drum dried to produce PIB-b-(TMSP)SBR(TMSP)-b-PIB (Example 15).

One fourth of the cement was terminated (50° C. bath for ~30 minutes) with a solution of 1-methyl-2-pyrrolidinone (NMP, 1.0 M in toluene), followed by reacting the cement with a solution of polyisobutylene succinic anhydride (PIBSA, 31.8 wt. % in hexane) at 50° C. for an additional 60 minutes. The polymer cement was coagulated in isopropanol containing about 0.2-1 wt. % of butylated hydroxytoluene (BHT) and drum dried to produce PIB-b-(NMP)SBR(NMP)-b-PIB (Example 16).

One fourth of the cement was terminated (50° C. bath for ~30 minutes) with a solution of N-benzylidene-methylamine (BMA, 1.0 M in toluene), followed by reacting the cement with a solution of polyisobutylene succinic anhydride (PIBSA, 31.8 wt. % in hexane) at 50° C. for additional an 60 minutes. The polymer cement was coagulated in isopropanol containing about 0.2-1 wt. % of butylated hydroxytoluene (BHT) and drum dried to produce PIB-b-(BMA)SBR (BMA)-b-P1B (Example 17).

The properties of Examples 11-17 are shown in Table 1.

TABLE 1

| | Polymer | Mn (g/mol) | Mw (g/mol) | Mp (g/mol) | PDI | % Coupling | Tg (° C.) |
|---|---|---|---|---|---|---|---|
| Example 11 | SBR | 162,766 | 174,443 | 178,704 | 1.07 | 0 | −22.7 |
| Example 12 | (BMA)SBR(BMA) | 160,941 | 169,872 | 178,337 | 1.06 | 0 | −22.8 |
| Example 13 | PIB-b-(BMA)SBR(BMA)-b-PIB | 162,052 | 170,439 | 178,611 | 1.05 | 0 | −22.2 |
| Example 14 | PIB-b-SBR-b-PIB | 315,091 | 374,541 | 441,202 | 1.19 | 64.6 | −24.9 |
| Example 15 | PIB-b-(TMSP)SBR(TMSP)-b-PIB | 215,597 | 228,318 | 238,577 | 1.06 | 0 | −24.5 |
| Example 16 | PIB-b-(NMP)SBR(NMP)-b-PIB | 237,988 | 268,749 | 255,715 | 1.13 | 7.8 | −23.0 |
| Example 17 | PIB-b-(BMA)SBR(BMA)-b-PIB | 221,471 | 256,483 | 228,901 | 1.16 | 13.2 | −23.3 |

Examples 18-24

Seven rubber compositions were prepared according to the formulations shown in Table 2 (all amounts shown are phr). The rubber compositions were prepared according to the procedure below:

| Mixer: 300 g Brabender | Agitation Speed: 60 rpm |
|---|---|

Master Batch Stage

| Initial Temperature | 110° C. |
|---|---|
| 0 min | charging polymers |
| 0.5 min | charging remaining ingredients |
| 5.0 min | drop |

Remill Stage

| Initial Temperature | 110° C. |
|---|---|
| 0 min | charging stocks |
| 5.0 min | drop |

Final Batch Stage

| Initial Temperature | 75° C. |
|---|---|
| 0 seconds | charging master stock |
| 30 seconds | charging curing agent and accelerators |
| 75 seconds | drop |

TABLE 2

|  | Example 18 | Example 19 | Example 20 | Example 21 | Example 22 | Example 23 | Example 24 |
|---|---|---|---|---|---|---|---|
| Masterbatch Polymer |  |  |  |  |  |  |  |
| Example 11 | 100 |  |  |  |  |  |  |
| Example 12 |  | 100 |  |  |  |  |  |
| Example 13 |  |  | 100 |  |  |  |  |
| Example 14 |  |  |  | 100 |  |  |  |
| Example 15 |  |  |  |  | 100 |  |  |
| Example 16 |  |  |  |  |  | 100 |  |
| Example 17 |  |  |  |  |  |  | 100 |
| Silica | 70 | 70 | 70 | 70 | 70 | 70 | 70 |
| Aromatic Oil | 30 | 30 | 30 | 30 | 30 | 30 | 30 |
| Bis-(3-(triethoxysilyl)-propyl)-tetrasulfide | 8 | 8 | 8 | 8 | 8 | 8 | 8 |
| Wax | 1.5 | 1.5 | 1.5 | 1.5 | 1.5 | 1.5 | 1.5 |
| Stearic Acid | 2 | 2 | 2 | 2 | 2 | 2 | 2 |
| N-(1,3-dimethylbutyl)-N-phenyl-p-phenylenediamine | 0.95 | 0.95 | 0.95 | 0.95 | 0.95 | 0.95 | 0.95 |
| Final Batch |  |  |  |  |  |  |  |
| Sulfur | 1.7 | 1.7 | 1.7 | 1.7 | 1.7 | 1.7 | 1.7 |
| N-(cyclohexylthio)phthalimide | 0.25 | 0.25 | 0.25 | 0.25 | 0.25 | 0.25 | 0.25 |
| Zinc Oxide | 2.5 | 2.5 | 2.5 | 2.5 | 2.5 | 2.5 | 2.5 |
| Cyclohexyl-benzothiazole sulfeniamide | 1.5 | 1.5 | 1.5 | 1.5 | 1.5 | 1.5 | 1.5 |
| Diphenylguanidine | 0.5 | 0.5 | 0.5 | 0.5 | 0.5 | 0.5 | 0.5 |

The final stocks were sheeted and molded at 155° C. for 15 minutes. Measurement of the tensile strength and dynamic viscoelastic properties gave the results shown in Table 3. Measurement of tensile strength is based on conditions of ASTM-D 412. The test specimen geometry was in the form of a ring of a width of 0.05 inches and of a thickness of 0.075 inches. The specimen was tested at a specific gauge length of 1.0 inches. The dynamic viscoelastic properties were measured with a Viscoelastic Analyzer. Temperature sweep experiments were conducted with a frequency of 5 Hz using 0.5% strain for temperatures ranging from −100° C. to −10° C., and 2% strain for the temperatures ranging from −10° C. to 100° C. The test specimen geometry was in the form of a strip having a length of 30 mm and of a width of 15 mm. Strain sweep experiments were conducted with a frequency of 5 Hz and at a temperature of 25° C. The strain varied from 0.25% to 14.75%. The test specimen geometry was in the form of a cylinder having a length of 10 mm and a diameter of 9 mm.

Figure 2:
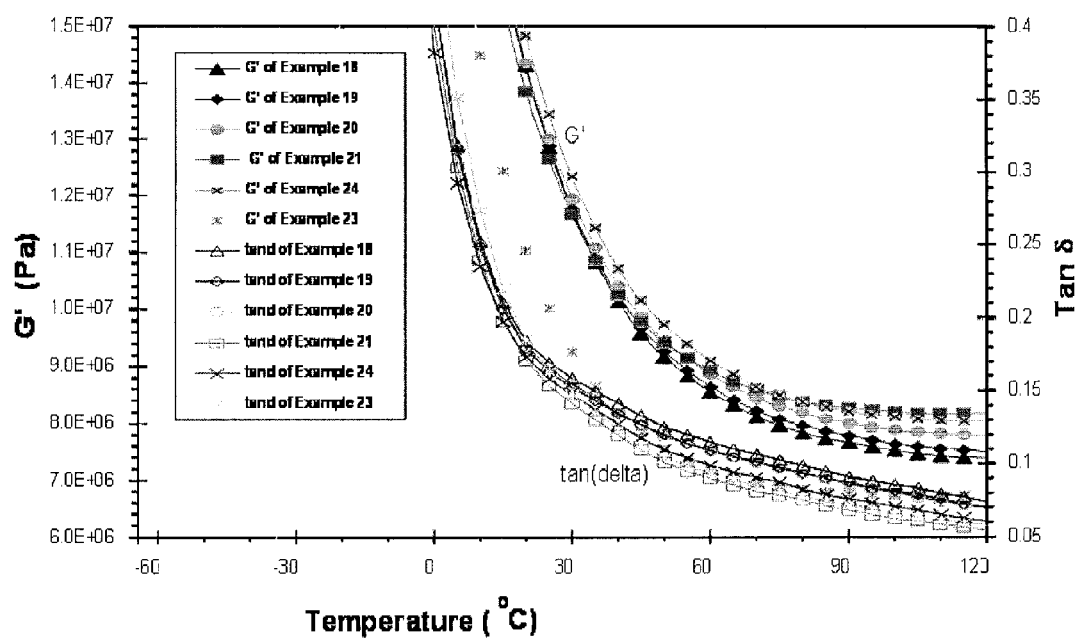
FIG. 2 is a graph of tangent delta and G' versus temperature for Example 18-24.
Figure 3:
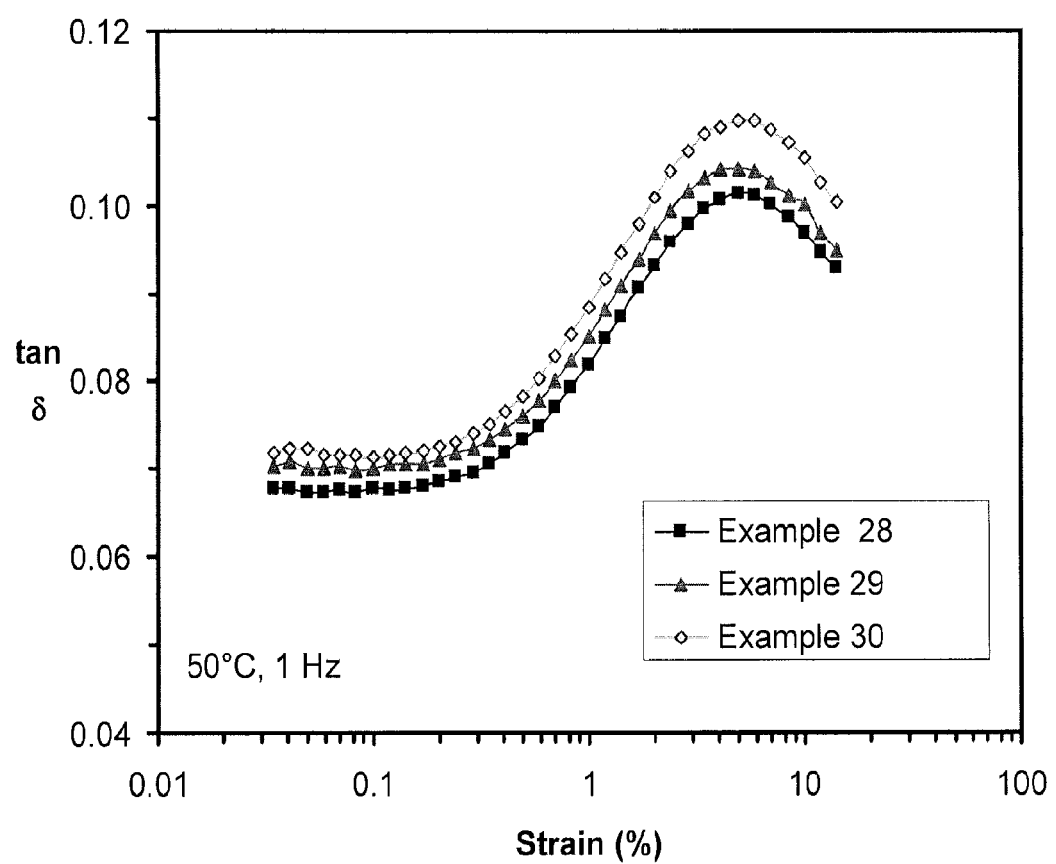
FIG. 3 is a graph of the tangent delta versus strain amplitude for Examples 28-30.

The results in Table 3 and FIG. 1 show that compounds containing the interpolymers of this disclosure gave a low tangent delta (tan δ) value from a strain sweep versus the compounds not containing the interpolymers of this disclosure. FIG. 2 shows that the compounds containing the interpolymers of this disclosure have a higher G' (dynamic modulus) at high temperatures versus the compounds not containing the interpolymers of this disclosure. FIG. 2 also shows that compounds containing the interpolymers of this disclosure have less temperature dependence at high temperatures ranging from 80 to 120° C. versus the compounds not containing the interpolymers of this disclosure, as seen by the G' curves. The results suggest that using the interpolymers of this disclosure in tire formulations has the potential to improve rolling resistance, handling and fade properties.

TABLE 3

|  | Ex. 18 | Ex. 19 | Ex. 20 | Ex. 21 | Ex. 22 | Ex. 23 | Ex. 24 |
|---|---|---|---|---|---|---|---|
| RING TENSILE (100° C.) |  |  |  |  |  |  |  |
| Eb (%) | 301 | 290 | 277 | 290.53 | 308 | 262 | 331 |
| Tb (MPa) | 8.32 | 3.28 | 8.91 | 10.25 | 10.14 | 8.65 | 11.09 |
| M300 (MPa) |  |  |  |  |  |  | 9.78 |
| M50 (MPa) | 1.45 | 1.47 | 1.49 | 1.68 | 1.5 | 1.48 | 1.4 |
| RING TENSILE (23° C.) |  |  |  |  |  |  |  |
| Eb (%) | 470 | 472 | 432 | 453 | 428 | 437 | 465 |
| Tb (MPa) | 18.38 | 19.6 | 18.12 | 20.63 | 18.49 | 20.73 | 19.67 |
| M300 (MPa) | 10.26 | 10.68 | 11.5 | 12 | 11.57 | 12.43 | 10.64 |
| M50 (MPa) | 1.8 | 1.94 | 1.94 | 1.85 | 1.83 | 1.75 | 1.62 |
| STRAIN SWEEP (25° C., RDAII B) |  |  |  |  |  |  |  |
| G' (MPa) @ 5%, 5 Hz: | 5.355514 | 5.543671 | 5.40304 | 5.644914 | 5.241588 | 5.237023 | 4.615372 |
| G" (MPa) @ 5%, 5 Hz: | 1.221899 | 1.198299 | 1.189505 | 1.061308 | 1.098475 | 1.034239 | 0.898612 |
| tand @ 5%, 5 Hz: | 0.228153 | 0.216154 | 0.220153 | 0.18801 | 0.209565 | 0.197491 | 0.194699 |
| Δ G' (MPa) [0.25-14%], 5 Hz: | 6.652556 | 6.605306 | 6.633069 | 6.046451 | 5.986281 | 5.392551 | 4.31674 |
| TEMPERATURE SWEEP (ARES B) |  |  |  |  |  |  |  |
| Peak tand@ 0.5%, 5 Hz: | 0.803045 | 0.812816 | 0.822684 | 0.848021 | 0.822842 | 0.87346 | 0.839942 |
| tand Tg (° C.) @ 0.5%, 5 Hz: | −11.4 | −11.5 | −11.5 | −13 | −13.2 | −11.2 | −12.4 |

SBR-b-PIB Diblock Interpolymer Preparation and Evaluation in Rubber Compounds as Rubber Component

Example 25

(HMI)SBR

To a 19 liter reactor equipped with turbine agitator blades was added 2.61 kg hexane, 1.06 kg of 33 wt % styrene in hexane, and 6.22 kg of 22.5 wt % butadiene in hexane. To the reactor was charged 1.63 ml of 1.6 M 2,2'-di(tetrahydrofuryl)propane in hexane, 1.41 ml of 3.0M hexamethyleneimine (HMI) and 3.31 ml of 1.60 M n-butyl lithium in hexane and the batch temperature was controlled at 49° C. After approximately 1 hour, the batch was cooled to 32° C. and a measured amount of live poly(styrene-co-butadiene) cement was then transferred to a sealed nitrogen purged 0.8 liter bottle. The bottle contents were then terminated with isopropanol, coagulated and drum dried. The isolated polymer had the following properties: Mn=137 kg/mol, PDI=1.06, Tg=−36° C., Percent Styrene 22.7%, Percent Vinyl=49.5%.

Example 26

(HMI)SBR-b-PIB

LPIB-SiCl was prepared by charging a solution of 4.7 g (0.05 mol) of chlorodimethylsilane, 57 g (0.05 mol) of vinyl end-caped polyisobutylene (Mn=1020 g/mol, PDI=1.6) and 0.1 ml of 2,2% Karstedt Pt-catalyst with 50 ml dry toluene to a 250 ml round-bottom flask equipped with a magnetic stir bar and a reflux condenser. The progress of the hydrosilation reaction was followed by 1H-NMR in CDCl3 by monitoring of the disappearance of vinyl and Si—H peaks in the range of 4 to 6 ppm. After refluxing for 24 h at 80° C., the product was obtained by removing the solvent.

To a 19 liter reactor equipped with turbine agitator blades was added 2.61 kg hexane, 1.06 kg of 33 wt % styrene in hexane, and 6.22 kg of 22.5 wt % butadiene in hexane. To the reactor was charged 1.63 ml of 1.6 M 2,2'-di(tetrahydrofuryl)propane in hexane, 1.41 ml of 3.0M hexamethyleneimine (HMI) and 3.31 ml of 1.60 M n-butyl lithium in hexane and the batch temperature was controlled at 49° C. After approximately 1 hour, the batch was cooled to 32° C. Approximately 400 g of cement was transferred from the 19 liter reactor into a 0.8 liter nitrogen purged bottle. To the bottle was added 1 mole of the LPIB-SiCl produced above (Mn=1020 g/mol, PDI=1.6) per mole of butyl lithium. The bottle contents were then coagulated in isopropanol and drum dried. The isolated polymer had the following properties: Mn=145 kg/mol, Tg=−36.4° C., Percent Styrene 23%, Percent Vinyl=49.5%.

Example 27

(HMI)SBR-b-FIB

HPIB-SiCl was prepared by charging a solution of 0.95 g (0.01 mol) of chlorodimethylsilane, 23 g (0.01 mol) of vinyl end-caped polyisobutylene (Mn=2306 g/mol, PDI=2.3) and 0.1 ml of 2.2% Karstedt Pt-catalyst with 50 ml dry toluene to a 250 ml round-bottom flask equipped with a magnetic stir bar and a reflux condenser. The progress of the hydrosilation reaction was followed by 1H-NMR in CDCl3 by monitoring of the disappearance of vinyl and Si—H peaks on the range of 4 to 6 ppm. After refluxing for 24 h at 80° C., the product was obtained by removing the solvent.

To a 19 liter reactor equipped with turbine agitator blades was added 2,61 kg hexane, 1.06 kg of 33 wt % styrene in hexane, and 6.22 kg of 22.5 wt % butadiene in hexane. To the reactor was charged 1.63 ml of 1.6 M 2,2'-di(tetrahydrofuryl)propane in hexane, 1.41 ml of 3.0M hexamethyleneimine (HMI) and 3.31 ml of 1.60 M n-butyl lithium in hexane and the batch temperature was controlled at 49° C. After approximately 1 hour, the batch was cooled to 32° C. Approximately 400 g of cement was transferred from the 19 liter reactor into a 0.8 liter nitrogen purged bottle. To the bottle was added 1 mole of the HPIB-SiCl produced above (Mn=2306 g/mol, PDI=2.3) per mole of butyl lithium. The bottle contents were then coagulated in isopropanol and drum dried. The isolated polymer had the following properties: Mn=149 kg/mol, Tg=−36.5° C. Percent Styrene 22.7%, Percent Vinyl=49.5%.

Examples 28-30

Three rubber compositions were prepared according to the formulations shown in Table 4 (all amounts shown are phr). The rubber compositions were prepared according to the same mixing procedure used to prepare Examples 18-24.

TABLE 4

|  | Example 28 | Example 29 | Example 30 |
|---|---|---|---|
| Masterbatch Polymer |  |  |  |
| Example 25 | 100 |  |  |
| Example 26 |  | 100 |  |
| Example 27 |  |  | 100 |
| N343 Carbon black | 50 | 50 | 50 |
| Aromatic Oil | 10 | 10 | 10 |
| Wax | 1 | 1 | 1 |
| Stearic Acid | 2 | 2 | 2 |
| N-(1,3-dimethylbutyl)-N-phenyl-p-phenylenediamine | 0.95 | 0.95 | 0.95 |
| Zinc Oxide | 2.5 | 2.5 | 2.5 |
| Final |  |  |  |
| Sulfur | 1.3 | 1.3 | 1.3 |
| Cyclohexyl-benzothiazole sulfenamide | 1.7 | 1.7 | 1.7 |
| Diphenylguanidine | 0.2 | 0.2 | 0.2 |

The final stocks were sheeted and molded at 165° C. for 15 minutes. Measurement of the tensile strength and dynamic viscoelastic properties gave the results shown in Table 5. Measurement of tensile strength is based on conditions of ASTM-D 412, The test specimen geometry was in the form of a ring of a width of 0.05 inches and of a thickness of 0.075 inches. The specimen was tested at a specific gauge length of 1.0 inches. The dynamic viscoelastic properties (G' and tan δ) were measured with a Viscoelastic Analyzer. Temperature sweep ("TS") experiments were conducted with a frequency of 5 Hz using 2% strain for temperatures ranging from −100° C. to 100° C. The test specimen geometry was in the form of a strip having a length of 30 mm and of a width of 15 mm. Strain sweep ("SS") experiments were conducted with a frequency of 1 Hz and at a temperature of 50° C. The strain varied from 0.25% to 14.75%. The test specimen geometry was in the form of a cylinder having a length of 10 mm and a diameter of 9 mm.

TABLE 5

|  | Example 28 HMI-SBR | Example 29 HMI-SBR-b-PIB (985 g/mol PIB) | Example 30 HMI-SBR-b-PIB (2136 g/mol PIB) |
|---|---|---|---|
| 50% Modulus @ 23° C. (MPa): | 1.32 | 1.29 | 1.27 |
| 300% Modulus @ 23° C. (MPa): | 13.6 | 13.3 | 12.0 |
| Tensile Break Stress @ 23° C. (MPa): | 17.7 | 15.2 | 16.1 |
| Elongation at Break @ 23° C. (%): | 375 | 345 | 360 |
| 50% Modulus @ 100° C. (MPa): | 0.99 | 0.96 | 0.96 |
| 200% Modulus @ 100° C. (MPa): | 5.48 | 5.30 | 5.39 |
| Tensile Break Stress @ 100° C. (MPa): | 7.26 | 6.25 | 6.89 |
| Elongation at Break @ 100° C. (%): | 247 | 232 | 243 |
| tan$^\delta$ [TS; −20° C.; 5 Hz, 2%]: | 1.08 | 1.05 | 1.06 |
| G'(MPa) [TS; −20° C.; 5 Hz, 2%]: | 50.0 | 50.7 | 51.3 |
| tan$^\delta$ [TS; 0° C.; 5 Hz, 2%]: | 0.382 | 0.381 | 0.376 |
| G'(MPa) [TS; 0° C.; 5 Hz, 2%]: | 8.79 | 9.25 | 9.22 |
| tan$^\delta$ [TS; 25° C.; 5 Hz, 2%]: | 0.196 | 0.202 | 0.186 |
| G'(MPa) [TS; 25° C.; 5 Hz, 2%]: | 5.18 | 5.45 | 5.57 |
| tan$^\delta$ [TS; 50° C.; 5 Hz, 2%]: | 0.147 | 0.153 | 0.138 |
| G'(MPa) [TS; 50° C.; 5 Hz, 2%]: | 4.01 | 4.21 | 4.40 |
| tan$^\delta$ [SS; 50° C.; 1 Hz, 5%]: | 0.101 | 0.104 | 0.110 |
| G'(MPa) [SS; 50° C.; 1 Hz, 5%]: | 2.33 | 2.32 | 2.24 |
| ΔG'(MPa) [SS; 50° C.; 1 Hz, 0.025%-14%]: | 0.81 | 0.83 | 0.85 |

The results in Table 5 show that compounds containing the interpolymers of this disclosure (Examples 29 and 30) generally may have higher G' at high temperatures versus the compound not containing the interpolymer of this disclosure (Example 28).

BR-b-PIB and PIB-b-BR-b-PIB Interpolymer Preparation and Evaluation in Rubber Compounds as Oil Replacement Preparation of Examples 31-37

A dried 28-oz or 7-oz glass bottle, which previously had been sealed with extracted septum liners and perforated crown caps under a positive nitrogen purge, was used for all of the preparations. Butadiene in hexane (blend 13-89, 21.6 weight percent butadiene), styrene in hexane (styrene blend, 33 weight percent styrene), hexane, n-butyllithium (1.60 M in hexane), 2,2-bis(2'-tetrahydrofuryl)propane solution (1,60 M in hexane, stored over calcium hydride), and di-t-butyl-p-cresol (BHT) solution in hexane (2 wt %) were used as supplied in the reactor room. Commercially available reagents and starting materials include the following: 4,4'-trimethylenedipiperidine (97%, Aldrich), N-benzylidene-methylamine (97%, "BMA", Aldrich), 1-(trimethylsilyl)-2-pyrrolidinone (96%, "TMSP", Aldrich), 1-methyl-2-pyrrolidinone (99.5%, "NMP", Aldrich), tetraethyl orthosilicate (99.99%, "TEOS", Aldrich), which were used as purchased without further purification. The polyisobutylene succinic anhydride ("PIBSA") had a Mw=1900, Mn=1000, and 95 meq of COOH/100 g, and was purchased from Chevron Chemicals under the trade name OLOA 15500.

Example 31

Synthesis of Rubber Component—TEOS Functionalized SBR

To a two gallon N$_2$ purged reactor equipped with a stirrer was added 1.576 kg of hexane, 0.412 kg of 33 wt % styrene in hexane and 2.496 kg of 21.8 wt % butadiene in hexane. The reactor was charged 3.03 ml of n-BuLi (1.60M) in hexane, and followed 1.0 ml of 2,2-bis(2'-tetrahydrofuryl)propane solution (1.60 M). The reactor jacket was heated to 50° C. After 34 minutes, the batch temperature peaked at 61.2° C. After an additional 30 minutes, a solution of 1.1 ml of tetraethyl orthosilicate (TEOS, 4.39M) in 30 g of hexane was added and agitated at 50° C. for 30 minutes. The polymer cement was coagulated in isopropanol containing about 0.2-1 wt. % of butylated hydroxytoluene (BHT) and drum dried. The properties of Example 31 are shown below.

| Example | Mn (g/mol) | Mw (g/mol) | Mp (g/mol) | PDI | % Coupling | Tg (° C.) |
|---|---|---|---|---|---|---|
| 31 | 211288 | 318112 | 276202 | 1.506 | 61.7 | −39.05 |

Example 32

BR

To a dried 28-oz glass bottle were added 123 g of hexane, and 230 g of 22.0 wt % butadiene in hexane, followed 1.56 ml of n-BuLi (1.60M) in hexane by hypodermic syringe. The bottle was agitated and heated at 50° C. for 1 hr. After polymerization, the cement was quenched by injection with 1.5 ml of isopropanol, treated with an antioxidant (3 ml of 2 wt % di-t-butyl-p-cresol in hexane), coagulated in isopropanol, then vacuum dried. Example 32 had the properties shown in Table 6.

Example 33

BR-b-PIB

To a dried 28-oz glass bottle were added 123 g of hexane, and 230 g of 22.0 wt % butadiene in hexane, followed 1.56 ml of n-BuLi (1.60M) in hexane by hypodermic syringe. The bottle was agitated and heated at 50° C. for 1 hr. 8 ml of solution of polyisobutylene succinic anhydride (PIBSA, 31.8 wt % in hexane) was added and agitated at 50° C. for additional 1 hr. The polymer cement was quenched by injection with 1.5 ml of isopropanol, treated with an antioxidant (3 ml of 2 wt % di-t-butyl-p-cresol in hexane), coagulated in isopropanol, then vacuum dried. Example 33 had the properties shown in Table 6.

Example 34

PIB-b-BR-b-PIB

To a dried 28-oz glass bottle was added 123 g of hexane, and 230 g of 22.0 wt % butadiene in hexane, followed 1.4 ml of 4,4'-trimethylenedipiperidine solution (1.0 M in toluene) and 1.90 ml of n-BuLi (1.60M) in hexane by hypodermic syringe. The bottle was agitated and heated at 50° C. for 1 hr. 16 ml of solution of polyisobutylene succinic anhydride (PIBSA, 31.8 wt. % in hexane) was added and agitated at 50° C. for additional 1 hr. The polymer cement was quenched by injection with 1.5 ml of isopropanol, treated with an antioxidant (3 ml of 2 wt % di-t-butyl-p-cresol in hexane), coagulated in isopropanol, then vacuum dried. Example 34 had the properties shown in Table 6.

Example 35

PIB-b-(NMP)BR(NMP)-b-PIB

To a dried 28-oz glass bottle was added 123 g of hexane, and 230 g of 22,0 wt % butadiene in hexane, followed 1.4 ml of 4,4'-trimethylenedipiperidine solution (1.0 M in toluene) and 1.90 ml of n-BuLi (1.60M) in hexane by hypodermic syringe. The bottle was agitated and heated at 50° C. for 1 hr. The living polymer was terminated with 4.8 ml of 1-methyl-2-pyrrolidinone solution (NMP, 1.0 M in toluene) at 50° C. for 30 minutes and followed reacted with 16 ml of solution of polyisobutylene succinic anhydride (PIBSA, 31.8 wt. % in hexane) at 50° C. for additional 1 hr. The polymer cement was quenched by injection with 1.5 ml of isopropanol, treated with an antioxidant (3 ml of 2 wt % di-t-butyl-p-cresol in hexane), coagulated in isopropanol, then vacuum dried. Example 35 had the properties shown in Table 6.

Example 36

PIB-b-(TMSP)BR(TMSP)-b-PIB

To a dried 28-oz glass bottle was added 123 g of hexane, and 230 g of 22.0 wt % butadiene in hexane, followed 1.4 ml of 4,4'-trimethylenedipiperidine solution (1.0 M in toluene) and 1.90 ml of n-BuLi (1.60M) in hexane by hypodermic syringe. The bottle was agitated and heated at 50° C. for 1 hr. The living polymer was terminated with 4.8 ml of 1-(trimethylsilyl)-2-pyrrolidinone solution (TMSP, 1.0 M in toluene) at 50° C. for 30 minutes and followed reacted with 16 ml of solution of polyisobutylene succinic anhydride (PIBSA, 31.8 wt. % in hexane) at 50° C. for additional 1 hr. The polymer cement was quenched by injection with 1.5 ml of isopropanol, treated with an antioxidant (3 ml of 2 wt % di-t-butyl-p-cresol in hexane), coagulated in isopropanol, then vacuum dried. Example 36 had the properties shown in Table 6.

Example 37

PIB-b-(BMA)BR(BMA)-b-PIB

To a dried 28-oz glass bottle was added 123 g of hexane, and 230 g of 22.0 wt % butadiene in hexane, followed 1.4 ml of 4,4'-trimethylenedipiperidine solution (1.0 M in toluene) and 1.90 ml of n-BuLi (1.60M) in hexane by hypodermic syringe. The bottle was agitated and heated at 50° C. for 1 hr. The living polymer was terminated with 4.8 ml of N-benzylidene-methylamine solution (BMA, 1.0 M in toluene) at 50° C. for 30 minutes and followed reacted with 16 ml of solution of polyisobutylene succinic anhydride (PIBSA, 31.8 wt. % in hexane) at 50° C. for additional 1 hr. The polymer cement was quenched by injection with 1.5 ml of isopropanol, treated with an antioxidant (3 ml of 2 wt % di-t-butyl-p-cresol in hexane), coagulated in isopropanol, then vacuum dried. Example 37 had the properties shown in Table 6.

TABLE 6

| | Mn (g/mol) | Mw (g/mol) | Mp (g/mol) | PDI | % Coupling | Tg (° C.) |
|---|---|---|---|---|---|---|
| Example 32 (BR) | 18059 | 18485 | 18618 | 1.024 | 0 | −59.35 |
| Example 33 (BR-b-PIB) | 20115 | 22723 | 18586 | 1.130 | 19.7 | −64.26 |
| Example 34 (PIB-b-BR-b-PIB) | 37639 | 41005 | 36248 | 1.089 | 14.8 | −49.69 |
| Example 35 (PIB-b-(NMP)BR(NMP)-b-PIB) | 32296 | 33480 | 34552 | 1.037 | 0 | −50.00 |
| Example 36 (PIB-b-(TMSP)BR(TMPS)-b-PIB) | 37045 | 37995 | 38887 | 1.026 | 0 | −48.64 |
| Example 37 (PIB-b-(BMA)BR(BMA)-b-PIB) | 40389 | 41436 | 42153 | 1.026 | 0 | −48.54 |

Examples 38-44

Eight rubber compositions were prepared according to the formulations shown in Table 7 (all amounts shown are phr). The rubber compositions were prepared according to the procedure below:

| Mixer: 300 g Brabender | Agitation Speed: 60 rpm |
|---|---|

Master Batch Stage

| Initial Temperature | 110° C. |
|---|---|
| 0 min | charging polymers |
| 0.5 min | charging remaining ingredients |
| 5.0 min | drop |

Masterbatch Stage

| Initial Temperature | 110° C. |
|---|---|
| 0 min | charging stocks |
| 0.5 min | charging ingredients |
| 5.0 min | drop |

Final Batch Stage

| Initial Temperature | 75° C. |
|---|---|
| 0 seconds | charging master stock |
| 30 seconds | charging curing agent and accelerators |
| 75 seconds | drop | and dynamic viscoelastic properties gave the results shown in Table 8. Measurement of tensile strength is based on ASTM D412. The dynamic viscoelastic properties (G' and tan δ) were measured with a Viscoelastic Analyzer. Temperature sweep experiments were conducted over a temperature range of −100° C. to 100° C. using a strain of 2% and a frequency of 10 Hz. The test specimen geometry was a rectangular strip having a width of 10 mm, a length of 40 mm, and a thickness of 2 mm. Strain sweep experiments were conducted with a frequency of 10 Hz and at a temperature of 60° C. The strain varied from 0.25% to 14.75%. The test specimen geometry was in the form of a cylinder having a length of 10 mm and a diameter of 9 mm.

TABLE 7

| | Example 38 | Example 39 | Example 40 | Example 41 | Example 42 | Example 43 | Example 44 |
|---|---|---|---|---|---|---|---|
| Masterbatch | | | | | | | |
| Example 31 Polymer | 80 | 80 | 80 | 80 | 80 | 80 | 80 |
| Natural Rubber | 20 | 20 | 20 | 20 | 20 | 20 | 20 |
| Silica | 52.5 | 52.5 | 52.5 | 52.5 | 52.5 | 52.5 | 52.5 |
| N-phenyl-N'-(1,3-dimethylbutyl)-p-phenylanediamine | 0.95 | 0.95 | 0.95 | 0.95 | 0.95 | 0.95 | 0.95 |
| Wax | 2 | 2 | 2 | 2 | 2 | 2 | 2 |
| Stearic Acid | 2 | 2 | 2 | 2 | 2 | 2 | 2 |
| Oil | 10 | | | | | | |
| Example 32 | | 10 | | | | | |
| Example 33 | | | 10 | | | | |
| Example 34 | | | | 10 | | | |
| Example 35 | | | | | 10 | | |
| Example 36 | | | | | | 10 | |
| Example 37 | | | | | | | 10 |
| Masterbatch | | | | | | | |
| Silica | 2.5 | 2.5 | 2.5 | 2.5 | 2.5 | 2.5 | 2.5 |
| Silane | 5 | 5 | 5 | 5 | 5 | 5 | 5 |
| Final | | | | | | | |
| Zinc Oxide | 2.5 | 2.5 | 2.5 | 2.5 | 2.5 | 2.5 | 2.5 |
| Sulfur | 1.5 | 1.5 | 1.5 | 1.5 | 1.5 | 1.5 | 1.5 |
| N-l-butylbenzothiazole-2-sulfenamide | 0.7 | 0.7 | 0.7 | 0.7 | 0.7 | 0.7 | 0.7 |
| 2,2-dithiobisbenzothiazole | 2 | 2 | 2 | 2 | 2 | 2 | 2 |
| N,N'-diphenylguanidine | 1.4 | 1.4 | 1.4 | 1.4 | 1.4 | 1.4 | 1.4 |

The final stocks were sheeted and molded at 165° C. for 15 minutes. Measurement of the tensile strength

TABLE 8

| | Example 38 | Example 39 | Example 40 | Example 41 | Example 42 | Example 43 | Example 44 |
|---|---|---|---|---|---|---|---|
| MICRO DUMBELL TENSILE (100° C.) | | | | | | | |
| Elongation at Break (%) | 209 | 238 | 216 | 207 | 207 | 210 | 218 |
| Tb (Mpa) | 6 | 7.3 | 6.9 | 6.8 | 7 | 7.2 | 7.3 |
| M200 (Mpa) | 5.7 | 5.92 | 6.23 | 5.48 | 6.76 | 6.82 | 6.57 |
| M50 (Mpa) | 1.67 | 1.64 | 1.62 | 1.7 | 1.85 | 1.82 | 1.86 |
| MICRO DUMBELL TENSILE (23° C.) | | | | | | | |
| Elongation at Break (%) | 389 | 411 | 418 | 375 | 359 | 384 | 380 |
| Tb (Mpa) | 14.3 | 15.5 | 17.6 | 15.9 | 15 | 16.8 | 16.1 |
| M200 (Mpa) | 10.1 | 10.23 | 11.33 | 11.37 | 11.94 | 12.24 | 11.83 |
| M50 (Mpa) | 1.74 | 1.81 | 1.9 | 2.02 | 2.06 | 2.22 | 2.11 |
| STRAIN SWEEP (60° C., ARES HT) | | | | | | | |
| G' (Mpa) @ 5%, 10 Hz: | 3.0 | 2.9 | 2.8 | 2.9 | 3.1 | 3.6 | 3.5 |
| G'' (Mpa) @ 5%, 10 Hz: | 0.3 | 0.3 | 0.3 | 0.2 | 0.3 | 0.3 | 0.3 |
| tand @ 5%, 10 Hz: | 0.088 | 0.113 | 0.100 | 0.086 | 0.088 | 0.091 | 0.091 |
| ΔG' (Mpa) [0.25-14%], 10 Hz: | 1.5 | 1.3 | 1.0 | 1.1 | 1.2 | 1.7 | 1.6 |

TABLE 8-continued

| | Example 38 | Example 39 | Example 40 | Example 41 | Example 42 | Example 43 | Example 44 |
|---|---|---|---|---|---|---|---|
| TEMPERATURE SWEEP (RDAII A) | | | | | | | |
| G' (Mpa) @ 0° C., 2%, 10 Hz: | 9.5 | 10.5 | 9.8 | 11.1 | 11.6 | 13.1 | 12.9 |
| G" (Mpa) @ 0° C., 2%, 10 Hz: | 3.1 | 3.0 | 3.0 | 3.4 | 3.3 | 3.7 | 3.8 |
| tand @ 0° C., 2%, 10 Hz: | 0.322 | 0.284 | 0.302 | 0.306 | 0.283 | 0.284 | 0.296 |
| G' (Mpa) @ 60° C., 2%, 10 Hz: | 5.4 | 5.8 | 5.3 | 5.9 | 6.6 | 7.2 | 7.0 |
| G" (Mpa) @ 60° C., 2%, 10 Hz: | 0.4 | 0.6 | 0.5 | 0.5 | 0.5 | 0.6 | 0.6 |
| tand @ 60° C., 2%, 10 Hz: | 0.081 | 0.102 | 0.097 | 0.085 | 0.074 | 0.088 | 0.088 |
| Peak tand @ 2%, 10 Hz: | 0.880 | 0.817 | 0.844 | 0.833 | 0.832 | 0.790 | 0.803 |
| Tg (° C.) @ 2%, 10 Hz: | −24.87 | −26.18 | −25.85 | −24.63 | −25.39 | −25.65 | −25.16 |

As can be seen in Table 8, using the interpolymers of the disclosure in place of processing oil may increase G' without affecting the tan δ when compared to the processing oil control (Example 38) and the liquid BR (Example 39).

The description has been provided with exemplary embodiments. Obviously, modifications and alterations will occur to others upon reading and understanding the preceding detailed description. It is intended that the exemplary embodiments be construed as including all such modifications and alterations insofar as they come within the scope of the appended claims or the equivalents thereof.

What is claimed is:

1. A block interpolymer comprising at least one diene block and at least one butyl block, wherein said at least one butyl block comprises residue from a functionalizing agent on at least one end adjacent to said diene block(s);
    wherein said at least one diene block comprises residue from a functionalizing agent on at least one end adjacent to the functionalizing agent residue on said butyl block(s);
    wherein the residue on said at least one diene block is derived from a functionalizing agent selected from the group consisting of carbon dioxide, benzophenones, benzaldehydes, imidazolidones, pyrrolidinones, carbodiimides, ureas, isocyanates, Schiff bases, trialkyltin halides, cyclic amino compounds, N-substituted aminoketones, N-substituted thioaminoketones, N-substituted aminoaldehydes, and N-substituted thioaminoaldehydes, sulfur-containing or oxygen containing azaheterocycles, boron-containing terminators, cyclic siloxanes, and α-halo-ω-amino alkanes, carbonyls, hydrazones, and mixtures thereof.

2. The block interpolymer of claim 1, wherein said at least one diene block comprises a copolymer of a conjugated diene monomer and vinyl aromatic monomer.

3. The block interpolymer of claim 2, wherein said at least one diene block comprises styrene butadiene copolymer.

4. The block interpolymer of claim 1, wherein the block interpolymer comprises a diene block and two butyl blocks.

5. The block interpolymer of claim 1, wherein the block interpolymer comprises two diene blocks and one butyl block.

6. The block interpolymer of claim 1, wherein the block interpolymer comprises a diene block with pendant butyl blocks.

7. The block interpolymer of claim 4, wherein said at least one diene block comprises residue from a functionalizing agent on at least one end adjacent to the functionalizing agent residue on said two butyl block(s).

8. The block interpolymer of claim 5, wherein said two diene blocks comprise residue from a functionalizing agent on at least one end adjacent to the functionalizing agent residue on said butyl block(s).

9. The block interpolymer of claim 6, wherein said at least one diene block comprises residue from a functionalizing agent on at least one end adjacent to the functionalizing agent residue on said pendant butyl block(s).

10. The block interpolymer of claim 1, wherein the residue on said at least one butyl block is derived from a functionalizing agent selected from the group consisting of hydroxyl, carboxyl, carbonyl, alkoxy, alkoxycarbonyl, cyano, amino, amido, imido, mercapto, carbamoyl, azido, ester, ether, urethane, peroxide, imidazolyl, anhydride and pyridine groups, and mixtures thereof.

11. The block interpolymer of claim 1, wherein the residue on said at least one butyl block is an anhydride.

12. The block interpolymer of claim 1, wherein said at least one diene block has a number average molecular weight of from 15,000 to 50,000.

13. The block interpolymer of claim 1, wherein said at least one diene block has a number average molecular weight of from 100,000 to 300,000.

14. The block interpolymer of claim 1, wherein the number average molecular weight of said at least one butyl block is from 1,000 to 100,000.

15. The block interpolymer of claim 1, wherein the number average molecular weight of said at least one butyl block is from 1,000 to 5,000.

16. A block interpolymer comprising at least one diene block and at least one butyl block, wherein said at least one butyl block comprises residue from a functionalizing agent on at least one end adjacent to said diene block(s);
    wherein said at least one diene block comprises residue from a functionalizing agent on at least one end adjacent to the functionalizing agent residue on said butyl block(s);
    wherein the residue on said at least one butyl block is an anhydride.

17. The block interpolymer of claim 16, wherein said at least one diene block has a number average molecular weight of from 100,000 to 300,000.

18. A block interpolymer comprising at least one diene block and at least one butyl block, wherein said at least one butyl block comprises residue from a functionalizing agent on at least one end adjacent to said diene block(s);
    wherein said at least one diene block comprises residue from a functionalizing agent on at least one end adjacent to the functionalizing agent residue on said butyl block(s);
    wherein the block interpolymer comprises two diene blocks and one butyl block.

* * * * *